United States Patent
Tsuji

(10) Patent No.: US 7,941,054 B2
(45) Date of Patent: May 10, 2011

(54) SYSTEM FOR EXTRACTING A CLOCK SIGNAL FROM OPTICAL SIGNAL INCLUDING PLURAL CLOCK FREQUENCIES AND A METHOD THEREFOR

(75) Inventor: Hiromi Tsuji, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 840 days.

(21) Appl. No.: 11/905,024

(22) Filed: Sep. 27, 2007

(65) Prior Publication Data

US 2008/0080870 A1 Apr. 3, 2008

(30) Foreign Application Priority Data

Sep. 29, 2006 (JP) .................................. 2006-268077

(51) Int. Cl.
*H04B 10/00* (2006.01)
*H04B 10/06* (2006.01)

(52) U.S. Cl. ........ 398/155; 398/154; 398/208; 398/212; 398/213

(58) Field of Classification Search .................. 398/154, 398/155, 208, 209, 212, 213
See application file for complete search history.

(56) References Cited

FOREIGN PATENT DOCUMENTS

| JP | 10-341239 | 12/1998 |
|----|-----------|---------|
| JP | 2005-252942 | 9/2005 |
| JP | 2006-49967 | 2/2006 |

OTHER PUBLICATIONS

Hiromi Tsuji et al., "Development of 160Gb/S Clock Extraction Using Electro-Absorption Modulator," Proceedings of 2003 conference, Institute of Electronics, Information and Communication Engineers (IEICE), B-10-115, 1 page, 2003.

*Primary Examiner* — Ken N Vanderpuye
*Assistant Examiner* — Daniel G Dobson
(74) *Attorney, Agent, or Firm* — Rabin & Berdo, PC

(57) ABSTRACT

In a clock signal extraction system, an optical modulator modulates an input optical signal having its clock frequency equal to a first or second frequency with a modulation electrical signal having its frequency equal to the average of the first and second frequencies to output a modulated optical pulse signal to a phase comparator, which receives a reference electrical signal generated by a reference signal generator and having its frequency half as high as a difference between the first and second frequencies to compare in phase the modulated optical pulse signal with the reference electrical signal to output a resultant phase comparison signal to a modulation electrical signal generator, which in turn outputs a modulation electrical signal to the optical modulator and clock signal generator, which generates a signal with the modulation and reference electrical signals mixed, and outputs the signal at first or second frequency as a clock signal.

15 Claims, 15 Drawing Sheets

SYSTEM FOR EXTRACTING A CLOCK SIGNAL FROM OPTICAL SIGNAL INCLUDING PLURAL CLOCK FREQUENCIES AND A METHOD THEREFOR

BACKGROUND OF THE INVENTION

1. Field of the Invention

The present invention relates to a clock signal extraction system and, more particularly, to a clock signal extraction system that extracts a clock signal from a received optical signal. The present invention also relates to a method of extracting a signal therefor.

2. Description of the Background Art

The clock signal extraction system is based on a technology that extracts from a received optical signal a clock signal providing the temporal reference of the optical signal and uses the extracted clock signal for gating to obtain information from the received optical signal.

Japanese Patent Laid-open Publication No. 2006-49967 discloses a trial clock signal extraction system including a hybrid component that may extract electrically and optically a clock signal from an optical signal. The clock signal extraction has thus been developed aiming at improving the performance of the extraction system.

A clock signal extraction system in a receiver of the optical time division multiplexing communication system is disclosed in Hiromi Tsuji et al., "Development of 160 Gb/s Clock Extraction Using Electro-Absorption Modulator," Proceedings of 2003 Conference, Institute of Electronics, Information and Communication Engineers (IEICE), B-10-115, 2003.

The conventional clock signal extraction systems disclosed use a bit rate of 40 [Gbit/s] per channel, and allow an optical signal on four channels to be optically time division multiplexed. The transmitter system in the optical time division multiplexing communications system is based upon the conventional clock signal extraction system, and transmits a return-to-zero (RZ) encoded optical pulse signal of 160 [Gbit/s] by the four-channel time-division multiplexing. The clock signal extraction system in the receiver therefore extracts a clock signal of 40 [GHz] from the optical pulse signal of 160 [Gbit/s].

When received by the receiver, an input optical signal is input to a clock signal extraction system. The input optical signal is of an RZ encoded optical pulse. The clock signal extraction system includes an electro-absorption modulator (EAM), an opto-electric converter, a first band pass filter, a phase comparator, a quadruple multiplier, a clock signal generator, a loop filter, a voltage controlled oscillator (VCO), a mixer, a second band pass filter, and an amplifier.

In the clock signal extraction system, the input optical signal is first input to the EAM modulator. The EAM modulator also receives as a control signal a modulation electrical signal. The modulation electrical signal is generated as follows. The VCO oscillator generates an electrical signal at a frequency of 40 [GHz]. The clock signal generator generates a reference electrical signal at a frequency f0 in the order of Gigahertz (GHz). The mixer mixes the electrical signal at a frequency of 40 [GHz] with the reference electrical signal. The mixed signal is filtered by the second band pass filter and amplified by the amplifier, thus providing the modulation electrical signal. The second band pass filter has its transmission band of which the center frequency is equal to (40-f0) [GHz].

When the optical signal propagates over the optical waveguide in the EAM modulator, the absorption coefficient of the optical waveguide is dependent upon the frequency of the modulation electrical signal input to the EAM modulator. Specifically, the optical signal propagating over the optical waveguide is transmitted or shut off at a frequency of (40-f0) [GHz]. The optical pulse signal of 160 [Gbit/s] is input to the EAM modulator. The EAM modulator outputs a component of the input optical signal that passes through a transmission window of (40-f0) [GHz] in the form of modulated optical pulse signal. The modulated optical pulse signal is input to the opto-electric converter where it is photoelectrically converted and output as a first electrical signal to the first band pass filter.

The first band pass filter has its transmission band whose center frequency is equal to 4×f0 [GHz]. The first filter filters the first electrical signal. The first band pass filter thus outputs a second electrical signal at a frequency of 4×f0 [GHz]. The second electrical signal is input to the phase comparator. The phase comparator compares in phase the input second electrical signal with a third electrical signal from the clock signal generator. The third electrical signal corresponds to a signal output from a quadruple multiplier when received the reference electrical signal at a frequency f0 in the order of GHz input via a splitter. The phase comparator outputs, when the second electrical signal and the third electrical signal are in phase with each other, a fourth electrical signal of 0 V. The phase comparator also outputs, when the second electrical signal and the third electrical signal are out of phase from each other, a fourth electrical signal having a voltage proportional to the phase difference.

The fourth electrical signal is input to the loop filter. The loop filter outputs a signal representative of intensity averaged over time as a fifth electrical signal to the VCO oscillator. The VCO oscillator has a function of outputting a sixth electrical signal at a frequency proportional to the voltage of the fifth electrical signal. The frequency of the sixth electrical signal from the VCO oscillator thus changes so that the second and third electrical signals are in phase with each other. The VCO oscillator is set to receive the fifth electrical signal of 0 V and output a signal at a frequency of 40 [GHz]. Therefore, when the second and third electrical signals are in phase with each other, the VCO oscillator outputs the sixth electrical signal at a frequency of 40 [GHz]. Specifically, in order to provide the sixth electrical signal at a frequency of 40 [GHz], the second electrical signal and the third electrical signal need to be synchronized with each other.

The modulated optical pulse signal is a signal which the EAM modulator performs modulation by a frequency resultant from mixing a frequency (40 [GHz]) equal to one fourth of the clock frequency (160 [GHz]) of an input optical pulse signal with a low frequency component f0 in the order of GHz to output. The first electrical signal is a signal into which the modulated optical pulse signal is converted by the opto-electric converter. The second electrical signal is the frequency component of 4×f0 [GHz] filtered from the frequency components of the first electrical signal that is transmitted by the first band pass filter. Therefore, the fact that the third electrical signal and the second electrical signal are in phase with each other corresponds to the fact that the input optical signal and the reference electrical signal are in phase with each other.

The sixth electrical signal output from the VCO oscillator is split by a splitter into two signals, one of which is input to the mixer.

The mixer receives the sixth electrical signal from the VCO oscillator and an electrical signal at a frequency f0 from the clock signal generator via the splitter. The mixer then outputs a seventh electrical signal resultant from combining a plurality of frequency components of (40±n×f0) [GHz]. Of the frequency components of the seventh electrical signal, only the electrical signal having a frequency component of (40-f0) [GHz] is transferred through the second band pass filter to the amplifier. The sixth electrical signal is split by the splitter into two signals as described above, the other of which is output from the clock signal extraction system as an extracted clock signal.

For an optical pulse signal involving a large timing jitter, Japanese '967 Publication proposes a method and a system that may extract a clock signal with the timing jitter removed.

Japanese '967 Publication indicated above discloses a different clock signal extraction system. The clock signal extraction system disclosed by the Japanese publication differs from the above clock signal extraction system in that it includes a first EAM modulator, an optical amplifier, and a second EAM modulator, all of which are cascade-connected in this order. The first EAM modulator modulates an optical pulse signal. The optical amplifier amplifies a first modulated optical pulse signal from the first EAM modulator. The second EAM modulator modulates the output signal from the optical amplifier, outputting a second modulated optical pulse signal. The electrical signal from the amplifier is split into two electrical signals. One of the electrical signals is input to the first EAM modulator, and the other electrical signal is phase-adjusted by the phase adjuster and then input to the second EAM modulator.

The input optical signal to the clock signal extraction system thus passes through the two EAM modulators. That makes it possible to narrow the duration of the second modulated optical pulse signal.

In the above two examples, the clock signal extraction system extracts the clock signal from the RZ encoded optical pulse signal. In contrast, another Japanese Patent Laid-open Publication No. 2005-252942 proposes a system and a method that extract a clock signal from a non-return-to-zero (NRZ) encoded optical pulse signal. The clock signal extraction system includes an optical phase controller, an opto-electric converter, and a band pass filter.

The optical phase controller receives an NRZ encoded input optical signal. The optical phase controller converts the input optical signal into the RZ encoded optical pulse signal. The opto-electric converter converts the optical pulse signal into an electrical pulse signal. The band pass filter extracts a clock signal component from the electrical pulse signal, and outputs it as an electrical clock signal.

The optical phase controller includes an optical splitter, an optical phase adjuster, and an optical multiplexer. The optical splitter splits the input optical signal encoded using the NRZ code into a first and a second NRZ signal. The optical phase adjuster delays the phase of the first NRZ signal. The optical multiplexer multiplexes the first NRZ signal that is phase-delayed by the optical phase adjuster and the second NRZ signal, thus generating a resultant optical pulse signal.

The phase delay of the first NRZ signal in the optical phase adjuster is set to a half (T/2) of the period (T) of the input optical signal. The optical phase adjuster is set so that the first NRZ signal is off-set in phase of the carrier wave by exactly half the wavelength against the second NRZ signal.

The input optical signal encoded using the NRZ code may thus be converted into the RZ encoded optical pulse signal, extracting a clock signal of frequency equal to the bit rate.

Another Japanese Patent Laid-open Publication No. 341239/1998 discloses a multi beat serial ATM line receiver. The ATM receiver is adapted to be able to automatically switch between two types of subscriber packages for 155 Mbps and 622 Mbps as if they were of a single subscriber package. The ATM receiver includes two systems of circuitry for 155 Mbps and 622 Mbps each comprised of a clock extraction circuit, a data retiming circuit and a header error control (HEC) detection circuit, and a single 155 Mbps/622 Mbps determination circuit. The clock extraction circuits each extract a clock signal from the received serial data. The data retiming circuits each perform data retiming. The HEC detection circuits each extract HEC data for detecting and correcting header error in a cell header. The 155 Mbps/622 Mbps determination circuit instructs a selector to select and send the received serial data that continuously detects the HEC data to the subsequent stage circuit.

Propagation of optical signals is possible under the condition that the more data flows over the network the more optical signals having different bit rates may propagate.

The above conventional clock signal extraction systems are used in a network having a fixed bit rate, and may extract a clock signal at a constant frequency. When data at different bit rates are propagated as in the giga bit Ethernet (trade name) and the SDH/SONET (Synchronous Digital Hierarchy/Synchronous Optical Network), for example, however, respective clock signal extraction systems are required corresponding to those bit rates. Even when data has the same bit rate, data added with a forward error correction code and data not added with the code have a substantially extended bit rate, so that two clock signal extraction systems are required respectively corresponding to data with the forward error correction code and data not with the code.

SUMMARY OF THE INVENTION

It is therefore an object of the present invention to provide a clock signal extraction system that may extract alone a clock signal from input optical signals having two clock frequencies or more, and a method of extracting a signal therefor.

The present invention provides a clock signal extraction system comprising: an optical modulator that intensity-modulates an input optical signal with a modulation electrical signal, outputting a modulated optical pulse signal, the input optical signal having a clock frequency substantially equal to a first frequency or a second frequency different from the first frequency, the modulation electrical signal having a modulation frequency of an average of the first and second frequencies; a reference signal generator that generates a reference electrical signal at a reference frequency; a phase comparator that compares in phase the modulated optical pulse signal with the reference electrical signal, and outputs a comparison result as a phase comparison signal; a modulation electrical signal generator that receives the phase comparison signal, and outputs the modulation electrical signal; and a clock signal generator that mixes the modulation electrical signal with the reference electrical signal, generates a combined signal, filters the combined signal, and outputs the filtered signal as a clock signal.

Also, the present invention provides a method of extracting a clock signal, comprising the steps of: receiving an input optical signal having a clock frequency substantially equal to a first frequency or a second frequency different from the first frequency; intensity-modulating the input optical signal with a modulation electrical signal, outputting a modulated optical pulse signal, the modulation electrical signal having a modulation frequency of an average of the first and second frequencies; generating a reference electrical signal at a reference frequency; comparing in phase the modulated optical pulse signal with the reference electrical signal, and outputting a comparison result as a phase comparison signal; receiving the phase comparison signal, and generating and outputting the modulation electrical signal; mixing the modulation electrical signal with the reference electrical signal, generating a combined signal, and filtering the combined signal, and outputting, when the input optical signal has a clock frequency of a first frequency, a clock signal at the first frequency, and outputting, when the input optical signal has a clock frequency of a second frequency, a clock signal at the second frequency.

A clock signal extraction system and a method of extracting a signal therefor according to the present invention are configured and operate as follows. A clock signal extraction system includes an optical modulator, a phase comparator, a reference signal generator, a modulation electrical signal generator, and a clock signal generator. The optical modulator receives from outside an input optical signal including a first or second frequency as a clock frequency. The modulator then intensity-modulates the signal with a modulation electrical signal at a modulation frequency fm, generating a modulated optical pulse signal. The modulator then outputs the signal to the phase comparator. The reference signal generator generates a reference electrical signal at a reference frequency. The generator then outputs the signal to the phase comparator and the clock signal generator. The phase comparator compares in phase the modulated optical pulse signal with the reference electrical signal. The comparator then outputs the comparison result to the modulation electrical signal generator as a phase comparison signal. The modulation electrical signal generator uses the phase comparison signal to generate the modulation electrical signal. The generator then outputs the modulation electrical signal to the optical modulator and the clock signal generator. The clock signal generator mixes the modulation electrical signal with the reference electrical signal, generating a combined signal. The generator then filters the combined signal, generating filtered signals. The generator then outputs the signal as a clock signal. The sole clock signal extraction system may thus extract a clock signal from two different clock frequency signal.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
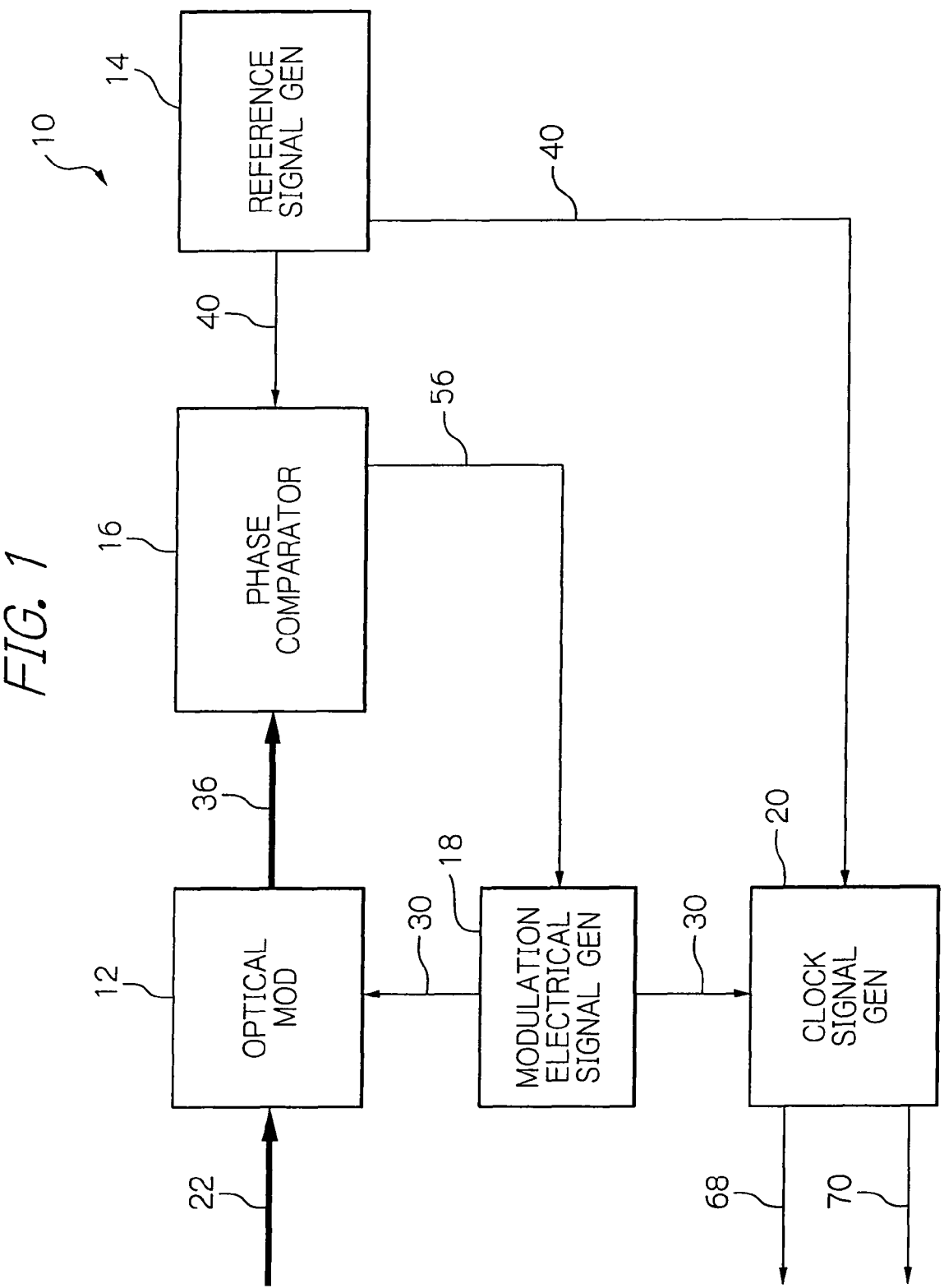
FIG. 1 is a schematic block diagram showing the configuration of a clock signal extraction system according to the present invention.

With reference to the accompanying drawings, preferred embodiments of a clock signal extraction system according to the present invention will be described in more detail below. Referring first to FIG. 1, a clock signal extraction system 10 according to an embodiment of the present invention includes an optical modulator 12 which receives from outside an input optical signal 22 including a clock frequency equal to either of frequencies f1 and f2 and intensity-modulates the signal 22 with a modulation electrical signal 30 at a modulation frequency fm to output a resultant modulated optical pulse signal 36 to a phase comparator 16, which in turn compares in phase the modulated optical pulse signal 36 with a reference electrical signal 40 generated at a reference frequency by a reference signal generator 14 to output a comparison result to a modulation electrical signal generator 18 as a phase comparison signal 56, on the basis of which the modulation electrical signal generator 18 produces the modulation electrical signal 30, which is fed to the optical modulator 12 and a clock signal generator 20, which mixes the modulation electrical signal 30 with the reference electrical signal 40 provided from the reference signal generator 14 and filters a resultant combined signal to output either of signals 68 and 70 thus filtered as a clock signal. Therefore, the single clock signal extraction system 10 can extract a clock signal from two signals of different clock frequencies.

The clock signal extraction system 10 of the instant illustrative embodiment to which a clock signal extraction system of the present invention is applied. Elements or components not relevant to understanding the present invention are omitted from description and illustration for simplicity and clarity. Signals are designated with reference numerals of connections on which they are conveyed. In the figures, thick lines are directed to optical paths, and thin lines to electric signal paths. Those figures show exemplified configurations, and are merely intended to schematically show the arrangement or the like of the components to an extent that the present invention can be well understood, and should not be comprehended as restricting the invention thereby. The invention is thus not limited to specific embodiments which will be described below. Also, in the following discussion, specific devices, specific conditions and the like may be involved, but they are provided simply as preferable examples, and the invention should not be limited thereto. Throughout the drawings, like components are designated by the same reference numerals, and their redundant description may be omitted.

Continuing to refer to FIG. 1, the optical modulator 12 receives from outside an input optical signal 22. The time reference of the input optical signal 22 is provided at a clock frequency f1 or f2. It is assumed here that the frequencies f1 and f2 are different and the frequency f2 is higher than the frequency f1.

The optical modulator 12 functions as stated below. The modulator 12 receives from outside an input optical signal 22 including different clock frequencies. The modulator 12 then intensity-modulates the optical signal 22 with a modulation electrical signal, outputting a resultant modulated optical pulse signal. The modulation electrical signal has a modulation frequency substantially equal to the average of the clock frequencies. The optical modulator 12 includes, as shown in FIG. 2, an electro-absorption modulator (EAM) 24, an amplifier 26, and a biasing source 28, which are interconnected as depicted.

Figure 2:
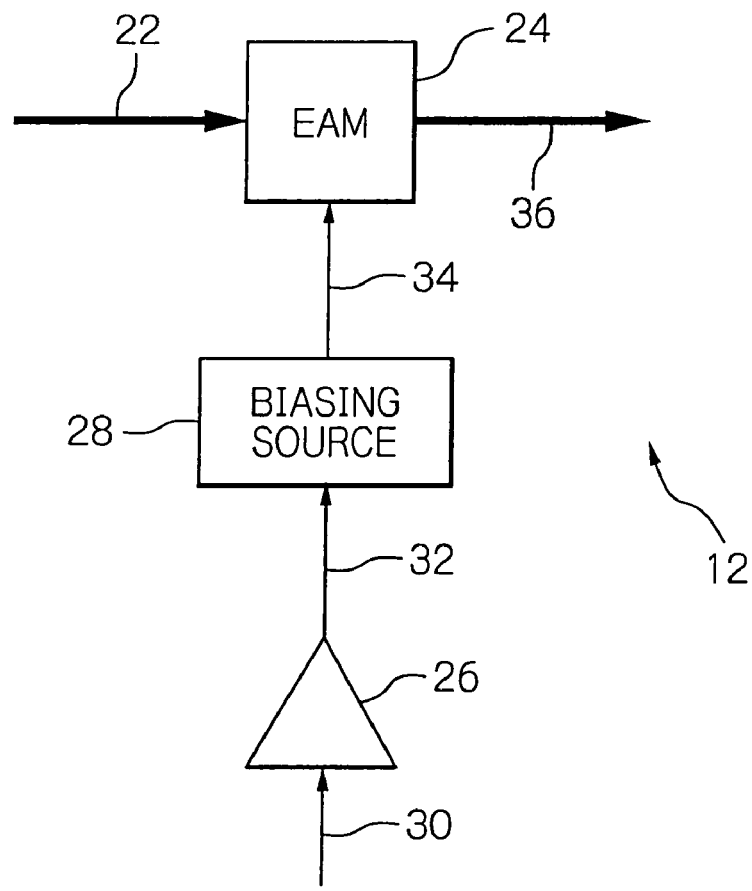
FIG. 2 is a schematic block diagram showing the configuration of an optical modulator in the clock signal extraction system shown in FIG. 1.

As seen from FIGS. 1 and 2, an input optical signal 22 is input to the EAM modulator 24 of the optical modulator 12. The optical modulator 12 also receives the modulation electrical signal 30 generated by the modulation electrical signal generator 18. The modulation electrical signal 30 is input to the amplifier 26 shown in FIG. 2, where the signal 30 is amplified. The amplifier 26 outputs an amplified modulation electrical signal 32 to the biasing source 28. The biasing source 28 feeds the amplified modulation electrical signal 32 with a bias voltage. The biasing source 28 then outputs the resulting signal to the EAM modulator 24 as a control signal 34. The modulation electrical signal 30 has a frequency substantially equal to average of the frequencies f1 and f2, i.e. the modulation frequency $fm=(f1+f2)/2$.

The EAM modulator 24 includes an optical waveguide over which the optical signal propagates. In the EAM modulator 24, the optical waveguide has its absorption coefficient for the optical signal propagating thereover dependent upon, i.e. varying with, the frequency of the modulation electrical signal 30 that is input to the EAM modulator 24 as the control signal 34. Specifically, the input optical signal 22 to the EAM modulator 24 is intensity-modulated by allowing or preventing the optical signal to propagate over the optical waveguide at the modulation frequency fm. The component that has passed through the transmission window at the modulation frequency fm is output as the modulated optical pulse signal 36. The EAM modulator 24 outputs the modulated optical pulse signal 36 to the phase comparator 16.

When the input optical signal 22 has a clock frequency f1, the modulated optical pulse signal 36 output from the EAM modulator 24 has its signal components of frequency including, in addition to the modulation frequency fm and the clock frequency f1, a frequency of $(f2-f1)/2=fm-f1$ as a mixing signal. When the input optical signal 22 has a clock frequency f2, the modulated optical pulse signal 36 output from the EAM modulator 24 has its signal components of frequency including, in addition to the modulation frequency fm and the clock frequency f2, a frequency of $(f2-f1)/2=f2-fm$ as a mixing signal.

Figure 3:
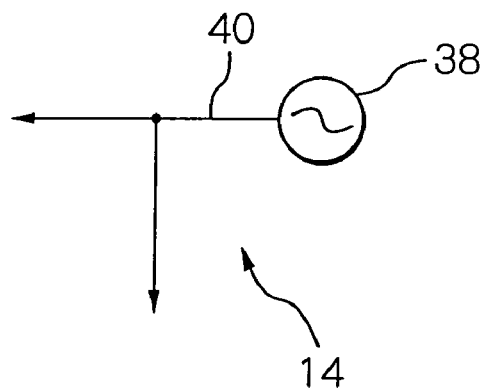
FIG. 3 is a schematic block diagram showing the configuration of a reference signal generator in the clock signal extraction system shown in FIG. 1.

The reference signal generator 14 has a function of generating and outputting a reference electrical signal at a reference frequency f0. The reference frequency f0 is half as high as the difference between the frequencies f1 and f2. Referring to FIG. 3, the reference signal generator 14 includes a clock signal generator 38 for generating the reference electrical signal 40 at the reference frequency f0. The generator 38 then branches the reference electrical signal 40 into two ways to output the signal 40 to the phase comparator 16 and the clock signal generator 20.

Figure 4:
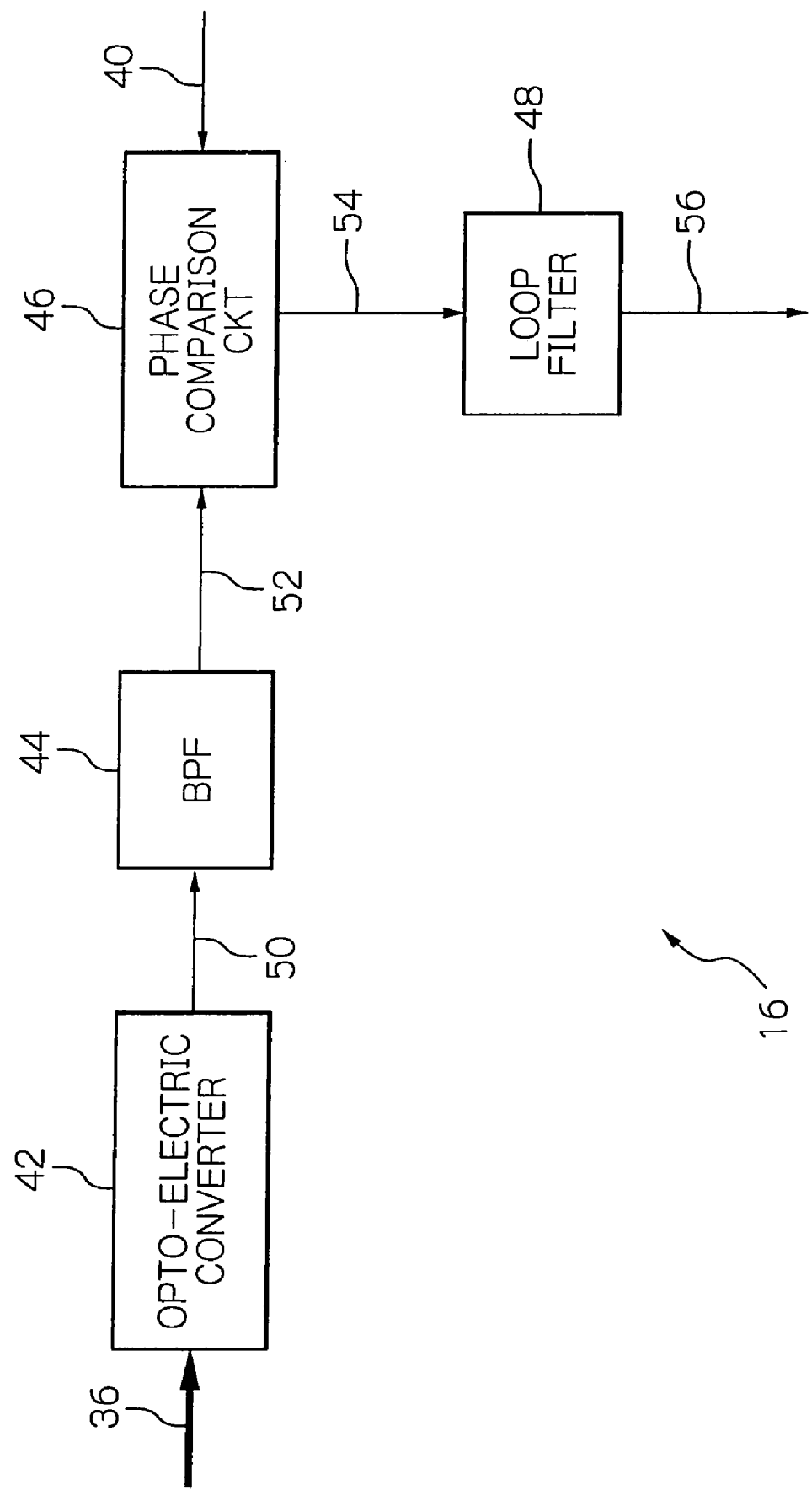
FIG. 4 is a schematic block diagram showing the configuration of a phase comparator in the clock signal extraction system shown in FIG. 1.

The phase comparator 16 has a function of comparing in phase the modulated optical pulse signal with the reference electrical signal, and outputting a comparison result as the phase comparison signal 56. Referring to FIG. 4, the phase comparator 16 includes an opto-electric converter 42, a band pass filter (BPF) 44, a phase comparison circuit 46, and a loop filter 48, which are interconnected as illustrated.

The opto-electric converter 42 converts the modulated optical pulse signal 36 from the optical modulator 12 to a modulated electrical pulse signal 50. The opto-electric converter 42 outputs the modulated electrical pulse signal 50 to the band pass filter 44.

The band pass filter 44 is set to have the center frequency of its transmission band, i.e. the transmission frequency, equal to the reference frequency f0. The band pass filter 44 filters the modulated electrical pulse signal 50, outputting an electrical pulse signal 52. Regardless of whether the input optical signal 22 has a frequency f1 or f2, the electrical pulse signal 52 at the reference frequency f0 is output to the phase comparison circuit 46. The phase comparison circuit 46 also receives the reference electrical signal 40 from the reference electrical signal generator 14.

The phase comparison circuit 46 compares in phase the electrical pulse signal 52 with the reference electrical signal 40. The comparison circuit 46 then supplies the phase difference electrical signal 54 as a comparison result to the loop filter 48. The phase difference electrical signal 54 has a voltage that increases in proportion to the phase difference of the electrical pulse signal 52 from the reference electrical signal 40. When the phase comparison circuit 46 determines that the electrical pulse signal 52 and the reference electrical signal 40 are in phase with each other, namely, the phase difference between both of them is equal to zero, the voltage of the phase difference electrical signal 54 is equal to 0 V.

The loop filter 48 may be a circuit applicable to a phase locked-loop (PLL) which is known by itself. The loop filter 48 includes a lag-lead filter, for example. The loop filter 48 averages the intensity of the input phase difference electrical signal 54 over time, and outputs the average as the phase comparison signal 56.

By the structure stated above, the phase comparator 16 compares in phase the modulated optical pulse signal 36 with the reference electrical signal 40, and outputs the phase comparison signal 56 as a comparison result to the modulation electrical signal generator 18.

Figure 5:
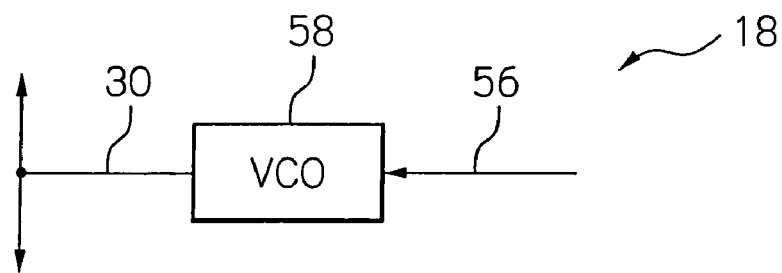
FIG. 5 is a schematic block diagram showing the configuration of a modulation electrical signal generator in the clock signal extraction system shown in FIG. 1.

The modulation electrical signal generator 18 has a function of being responsive to the phase comparison signal and outputting the modulation electrical signal. Referring to FIG. 5, the modulation electrical signal generator 18 includes a voltage controlled oscillator (VCO) 58. The VCO oscillator 58 is operative in response to the phase comparison signal 56 to output the modulation electrical signal 30, which is a sinusoidal wave of electrical signal at a frequency proportional to the voltage of the phase comparison signal 56. The VCO oscillator 58 outputs a signal at the center frequency when the phase comparison signal 56 has a voltage of 0 V. The center frequency may be set to the modulation frequency fm. Therefore, when the modulated optical pulse signal 36 and the reference electrical signal 40 are in phase with each other, the VCO oscillator 58 can output the modulation electrical signal 30 at the modulation frequency fm. The modulation electrical signal 30 is branched into two signals, which are then sent to the optical modulator 12 and the clock signal generator 20, respectively.

In this embodiment, the modulated electrical pulse signal 36 is compared in phase with the reference electrical signal 40 by the phase comparator 16, and the phase difference electrical signal 54 as the difference component is extracted by the loop filter 48 as the phase comparison signal 56. The clock signal extraction system 10 forms a PLL based circuit that is responsive to the phase comparison signal 56 input to the VCO oscillator 58 to bring the oscillation signal of the VCO oscillator 58 in phase with the input optical signal 22.

Figure 6:
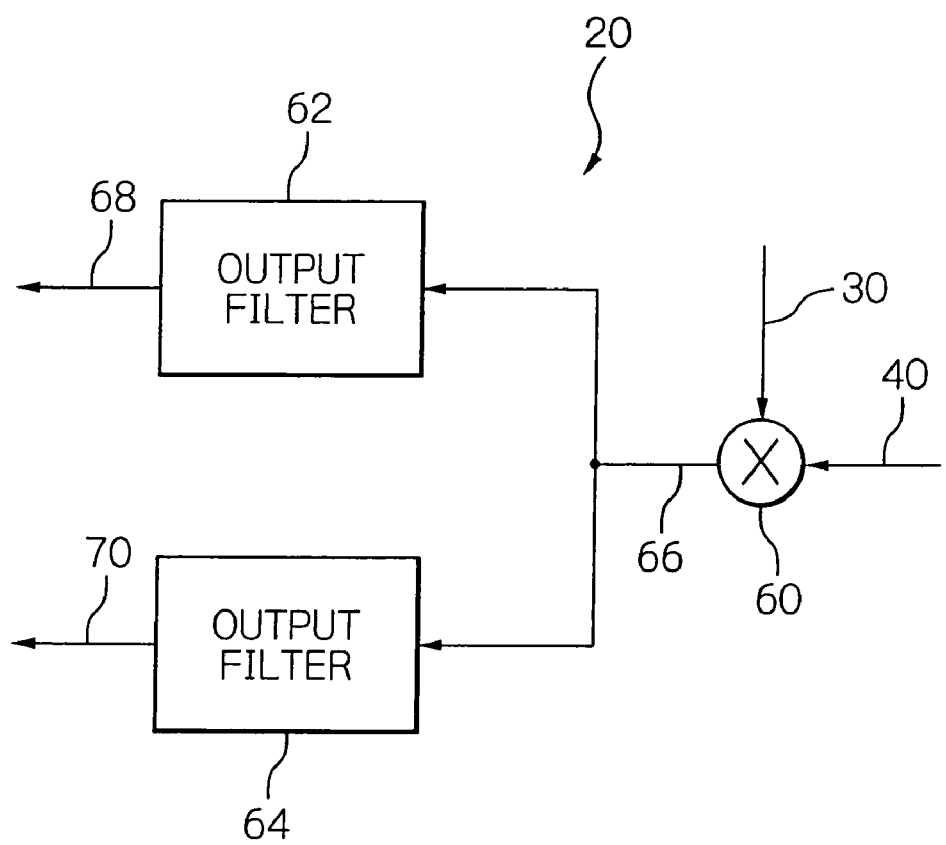
FIG. 6 is a schematic block diagram showing the configuration of a clock signal generator in the clock signal extraction system shown in FIG. 1.

The clock signal generator 20 has a function of mixing the modulation electrical signal with the reference electrical signal, thus producing a resultant combined signal, and filtering the combined signal to produce the clock signals 68 and 70, FIG. 1. Referring now to FIG. 6, the clock signal generator 20 includes a mixer 60, and output filters 62 and 64, which are interconnected as shown. The generator 20 outputs, when the input optical signal 22 has the clock frequency f1, the clock signals 68 at the frequency f1. The generator 20 outputs, when the input optical signal 22 has the clock frequency f2, the clock signals 70 at the frequency f2.

The mixer 60 mixes the modulation electrical signal 30 with the reference electrical signal 40, producing a resultant combined signal 66 which includes a sum and a difference frequency signal obtained between the modulation electrical signal 30 and the reference electrical signal 40. The combined signal 66 is branched into two signals, which are then sent to the output filters 62 and 64, respectively.

The output filter 62 transmits, when the transmission frequency is set to f1, a component of the frequency f1 of the combined signal 66. The modulation frequency fm is given by fm=(f1+f2)/2. The reference frequency f0 is given by f0=(f2−f1)/2. The difference frequency signal in the combined signal 66 thus has a frequency f1=fm−f0.

The output filter 64 transmits, when the transmission frequency is set to f2, a component of the frequency f2 of the combined signal 66. The sum frequency signal in the combined signal 66 then has a frequency f2=fm+f0.

The clock signal generator 20 outputs as a clock signal either of the output signal 68 from the output filter 64 and the output signal 70 from the output filter 64.

The clock signal extraction system 10 has two output terminals of the clock signal, which output the output signals 68 and 70, respectively, as the clock signal. The output signals 68 and 70 may be alternatively selected by a utility circuit, not shown, provided outside the clock signal extraction system 10 to be used as a clock signal for the utility circuit.

It is preferable that the frequencies f1 and f2 satisfy the relationship of f0<f1 and f0<f2. If the relationship is not satisfied, the electrical pulse signal input to the phase comparator 16 may include other frequency components causing noise. It is particularly preferable that the reference frequency f0 is not a multiple of the frequency f1 or f2.

A description will now be given of specific examples where two optical pulse signals having different data rates, with and without the forward error correction (FEC) code, are input as the input optical signals in the SDH/SONET (Synchronous Digital Hierarchy/Synchronous Optical Network).

The frequency f1 is a clock frequency without FEC and is 39.81312 [GHz], the data rate being equal to 39.81312 Gbps. The frequency f2 is a clock frequency with FEC and is 41.25 [GHz], the data rate being equal to 41.25 Gbps. The modulation frequency fm is an average of the frequencies f1 and f2, and is 40.53156 [GHz]. The reference frequency f0 is half of the difference between the frequencies f1 and f2, and is 0.71844 GHz.

It is to be noted that the values of frequencies f1 and f2 are not limited to the examples. It is preferable that the reference frequency f0 is set to less than or equal to 1 GHz, allowing the opto-electric converter 42 to have a lower frequency band.

The clock signal extraction system of this embodiment sets the clock frequency of the input optical signal to f1 or f2. The input optical signal is intensity-modulated with the modulation electrical signal at the modulation frequency fm given by the average of the frequencies f1 and f2, thus generating the modulated optical pulse signal. Regardless of which of the clock frequencies, f1 and f2, the input optical signal has, the modulated optical pulse signal has a frequency which is half as high as the difference between the frequencies f1 and f2. When the phase of the modulation electrical signal is adjusted to provide zero phase difference of the modulated optical pulse signal from the reference electrical signal at the reference frequency f0, and a combined signal is generated that includes the sum and difference frequency signals obtained between the modulation electrical signal and the reference electrical signal, the clock signal may be extracted regardless of which of clock frequencies, f1 and f2, the input signal has. The sole clock signal extraction system 10 may thus extract the clock signal from a signal having two different clock frequencies.

Figure 7:
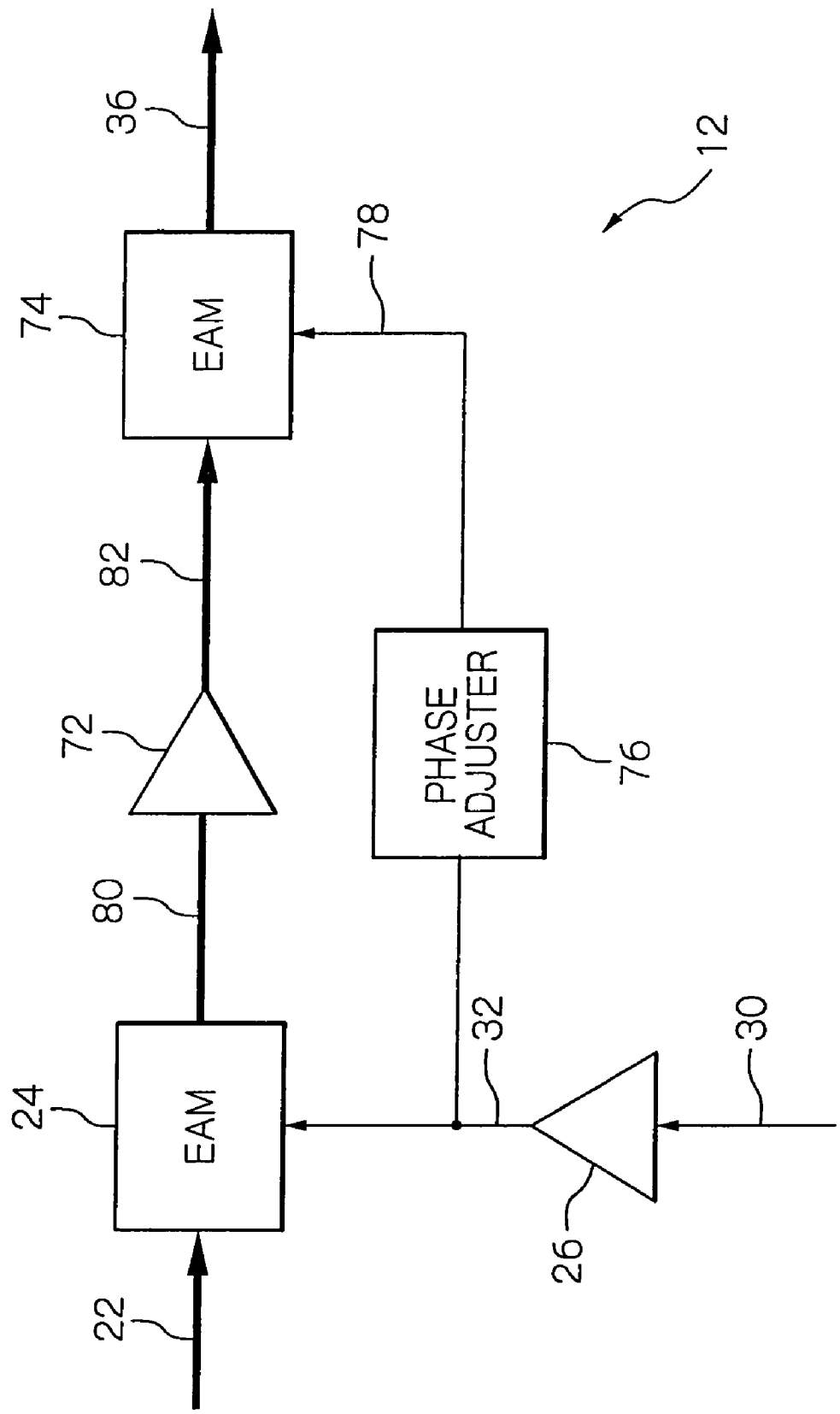
FIG. 7 is a schematic block diagram showing an alternative configuration of the optical modulator in the clock signal extraction system shown in FIG. 1.

The optical modulator 12 in the clock signal extraction system 10 may alternatively be adapted to include the EAM modulator 24, an optical amplifier 72, an EAM modulator 74, the amplifier 26, and a phase adjuster 76, which are interconnected as shown in FIG. 7. The clock signal extraction system 10 per se may be the same as shown in FIG. 1 except the optical modulator 12.

The optical modulator 12 shown in FIG. 7 additionally includes the optical amplifier 72, the EAM modulator 74, and the phase adjustment 76 as such. The optical amplifier 72 has a function of amplifying the optical signal. The EAM modulator 74 has a similar function to the EAM modulator 24. The phase adjuster 76 has a function of adjusting the phase variation in the modulation electrical signal 30, and outputting a modulation electrical signal having the precise phase.

In the optical modulator 12 shown in FIG. 7, the modulation electrical signal 30 input is amplified by the amplifier 26 and is branched into two signals, which are in turn sent to the EAM modulator 24 and the phase adjuster 76, respectively. The phase adjuster 76 adjusts the phase of the modulation electrical signal 30, and outputs an adjusted modulation electrical signal 78 to the EAM modulator 74.

The EAM modulator 24 modulates the input optical signal 22 with the modulation electrical signal 32. The EAM modulator 24 then supplies a modulated optical signal 80 to the optical amplifier 72. The optical amplifier 72 amplifies the optical signal 80, and outputs an amplified optical signal 82 to the EAM modulator 74. The EAM modulator 74 modulates the optical signal 82 with the modulation electrical signal 78. The EAM modulator 74 outputs the modulated optical signal to the phase comparator 16 as the modulation optical signal 36.

According to that structure, the input optical signal 22 passes through two EAM modulators 24 and 74. Specifically, the input optical signal 22 passes through two transmission windows. Compared to the case in which the EAM modulator is provided in single, the modulated optical pulse signal may have a narrower time width. The optical pulse signal may thus have a larger S/N ratio, providing a larger loop gain of the PLL. Therefore, even when the input optical signal 22 includes a larger jitter as timing, it is possible to provide a clock signal extraction system that may act as the PLL based system.

Figure 8:
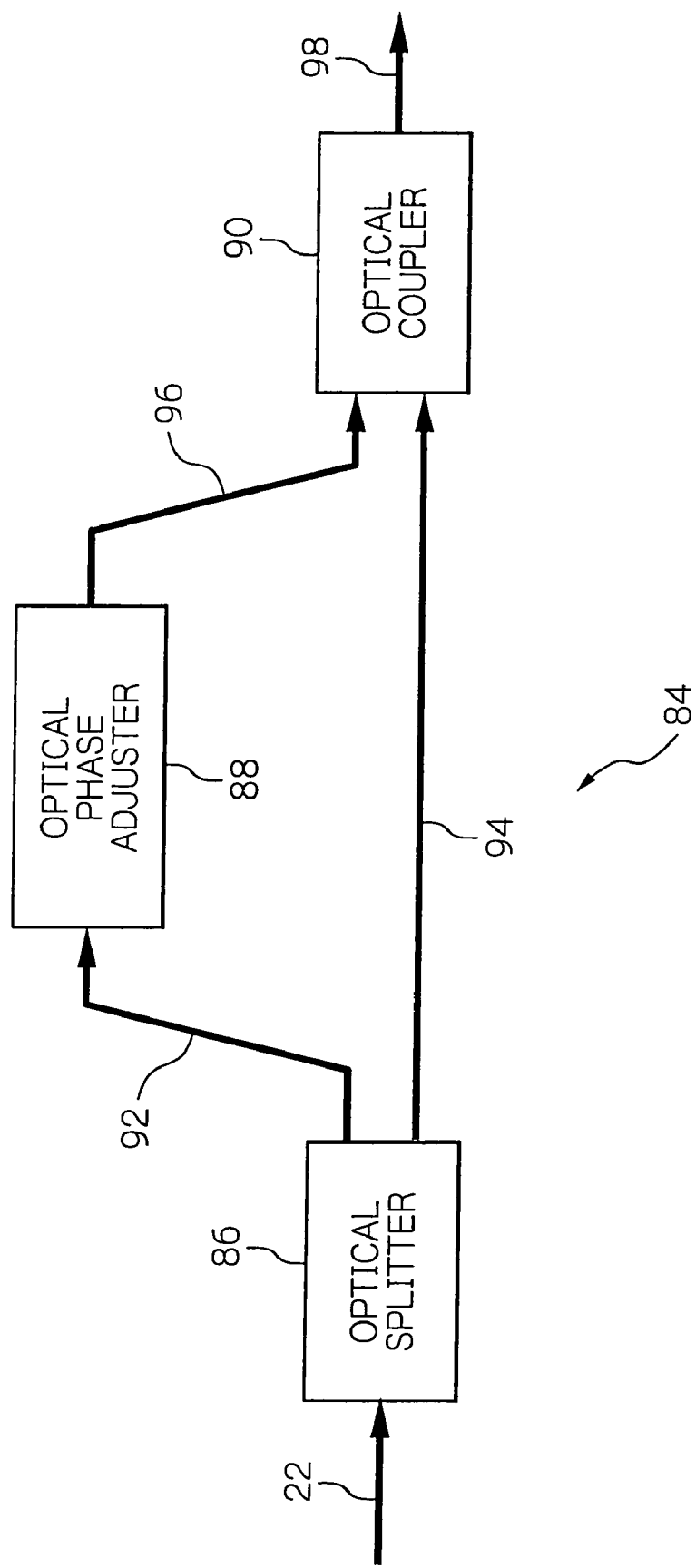
FIG. 8 is a schematic block diagram showing the configuration of an optical phase controller added to the optical modulator shown in FIG. 1.

In the clock signal extraction system 10, the optical modulator 12 may include an optical phase controller 84 as shown in FIG. 8 before the input of the EAM modulator 24. The optical phase controller 84 has a function of converting a non return to zero (NRZ) signal to an RZ signal, the NRZ signal being encoded using the NRZ code. As shown in FIG. 8, the optical phase controller 84 includes an optical splitter 86, an optical phase adjuster 88, and an optical multiplexer 90, which are interconnected as illustrated. The optical splitter 86 has a function of splitting the input optical signal. The optical phase adjuster 88 has a function of delaying the phase of the input optical signal so as to adjust the phase. The optical multiplexer 90 has a function of coupling the supplied optical signals, thus developing a combined optical signal.

The optical splitter 86 splits the input optical signal 22 encoded using the NRZ code into the optical signals 92 and 94. The optical phase adjuster 88 sets the phase delay for the optical signal 92 to a half (T/2) of the period (T) of the input optical signal 22. The optical phase adjuster 88 delays the phase of the optical signal 92, and supplies the delayed and adjusted optical signal 96 to the optical multiplexer 90. The optical multiplexer 90 receives the optical signals 96 and 94, and multiplexes them, thus producing the optical pulse signal 98.

Figure 9:
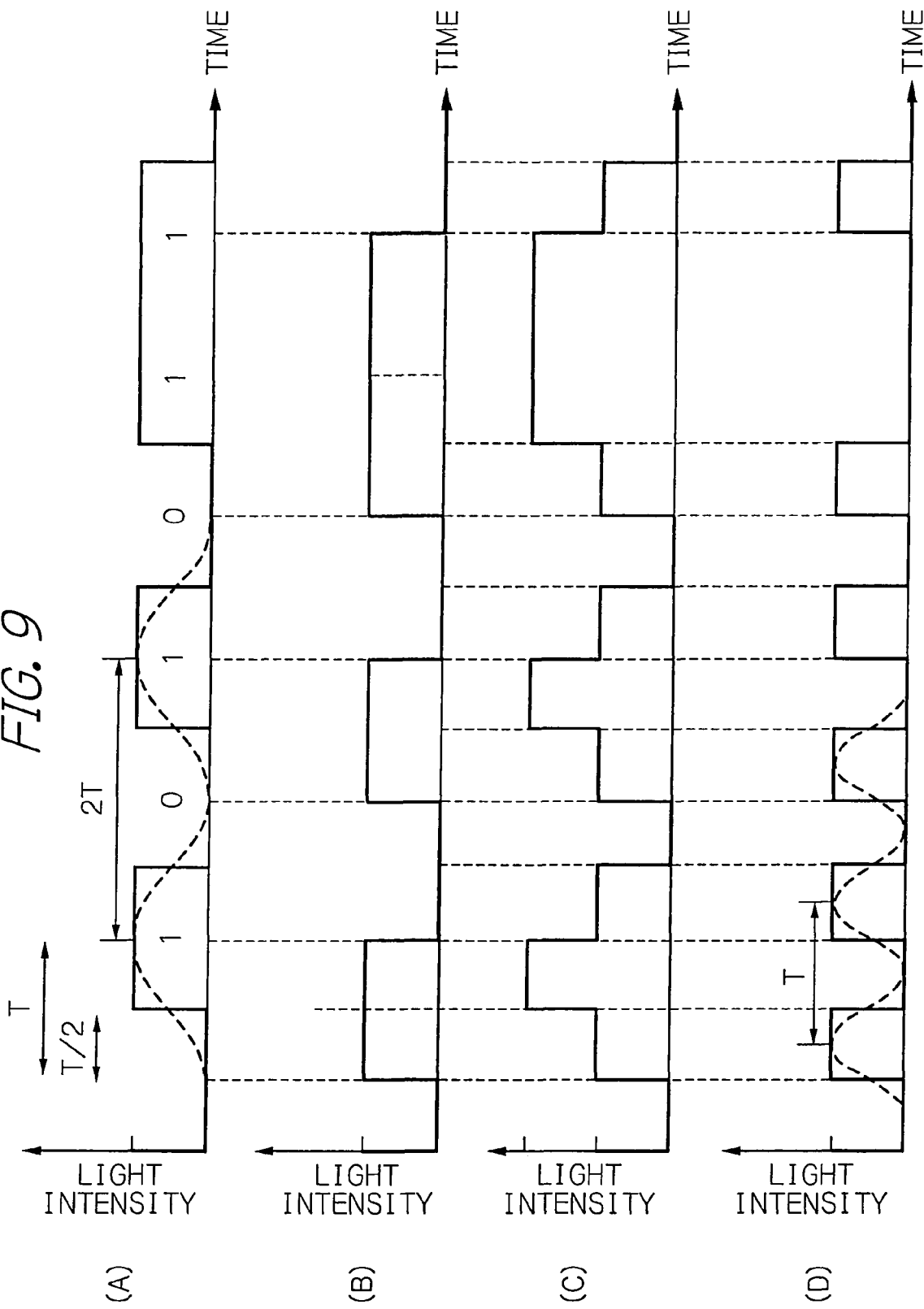
FIG. 9 illustrates output signals from the optical phase controller shown in FIG. 8.

Referring now to FIG. 9, a description will be given of the conversion of the NRZ signal indicating a bit stream of "101011" into an RZ signal. In the figure, the x-axes define time and the y-axes optical intensity. The x-axes and the y-axes are in an arbitrary scale.

FIG. 9, line (A), shows the input optical signal 22. The input optical signal 22 is set to the NRZ signal. Therefore, when the optical signal 22 includes consecutive sets of data "11", the optical intensities in that duration do not become zero. Line (B), shows the optical signal (NRZ signal) 96 delayed by the optical phase adjuster 88. The optical signal (NRZ signal) 94 is not delayed. The signal 94 is thus observed as the same waveform as in line (A).

When the carrier waves of the optical signals (NRZ) 92 and 94 are in phase with each other at the optical coupler 90, the optical intensities of the input optical signals 92 and 94 are simply added. The optical pulse signal 98 from the optical phase controller 84 then has the wave form shown in line (C). However, when the carrier waves of the optical signals (NRZ) 92 and 94 are shifted in phase by exactly half the wavelength at the optical coupler 90, the optical pulse signal from the optical phase controller 84 then has the waveform shown in line (D).

If the optical pulse signal 98 having the shape shown in FIG. 9, line (A) or (B), it is input to the opto-electric converter 42, where the optical pulse signal 98 is converted into the electrical pulse signal 50, and the band pass filter 44 filters the signal 50, the filter 44 may not extract a radio frequency (RF) signal at a frequency 1/T. This is because when the optical pulse signal 98 shown in FIG. 9, line (A), is photoelectrically converted, providing the electrical signal 50, the signal 50 includes the sinusoidal wave shaped RF signal component at a frequency 1/2T shown by the broken line, but does not include the RF signal component at the frequency 1/T.

In contrast, when the optical pulse signal 98 having the waveform shown in FIG. 9, line (D), is input to the opto-electric converter 42, where the optical pulse signal 98 is converted into the electrical pulse signal 50, and the band pass filter 44 filters the signal 50, the band pass filter 44 may extract the RF signal at the frequency 1/T. This is because when the optical pulse signal 98 shown in line (D) is photo-electrically converted, providing the electrical signal 50, the signal 50 includes the RF signal component at the frequency 1/T.

The optical pulse signal 98 having the waveform shown in FIG. 9, line (D), may be obtained when the optical phase adjuster 88 adds the optical signal 92 with a time delay with respect to the optical signal 94, the time delay corresponding to a half (T/2) of the period (T), and also adjusts the carrier wave of the optical signal 92 so that the carrier waves of the signals 92 and 94 are shifted by exactly half the wavelength. A delay corresponding to half the period and a delay corresponding to half the phase of the carrier wave are independent physical quantities. A common delay that always satisfies the above condition is thus not present.

However, when the optical signals 92 and 94 have a data rate of 40 Gbps and the carrier waves have a wavelength of 1.5 µm, the optical path length L for the time delay corresponding to a half (T/2) of the period is given as L=(T/2)×c and is 3.75 mm. The optical path length l causing a delay that corresponds to half the phase of the carrier wave is given by $\lambda/2$, providing l=0.75 µm.

Specifically, the optical signal 92 may be added with a time delay corresponding to half the period by allowing the optical phase adjuster 84 to add an optical path length of 3.75 mm to the optical signal 92. In order that the phase of the carrier wave of the optical signal 92 is shifted by half the wavelength, the optical signal 92 is further adjusted to the optical path length of 0.75 µm. The readjustment changes the waveform of the optical pulse signal 98 from the optical phase controller 84 to the waveform shown in FIG. 9, line (D).

Even when the optical signal 92 is added with an optical path length of 3.75 mm and then the optical path length is adjusted within a range of ±0.75 µm, this provides approximately no affect to the function of adding the optical signal 92 with a time delay corresponding to half the period with sufficient accuracy. Specifically, compared to the optical path length of 3.75 mm, the optical path length of 0.75 µm is practically sufficiently shorter and negligible. It is therefore practically possible to add the optical signal 92 with a time delay corresponding to half the period, and then with an optical path length causing the carrier wave phase to be shifted by half the wavelength. According to the system thus structured, one can extract a clock signal equal to the data rate from the input optical signal 22 encoded using the NRZ code.

The reference signal generator 14 and the phase comparator 16 in the clock signal extraction system 10 may be not specifically limited to those shown in FIGS. 3 and 4. Alternatively, the generator 14 and the comparator 16 may include the components shown in FIGS. 10 and 11, respectively. The optical modulator 12, the modulation electrical signal generator 18, and the clock signal generator 20 in the clock signal extraction system 10 have configurations similar to those shown in FIGS. 2, 5, and 6, respectively.

Figure 10:
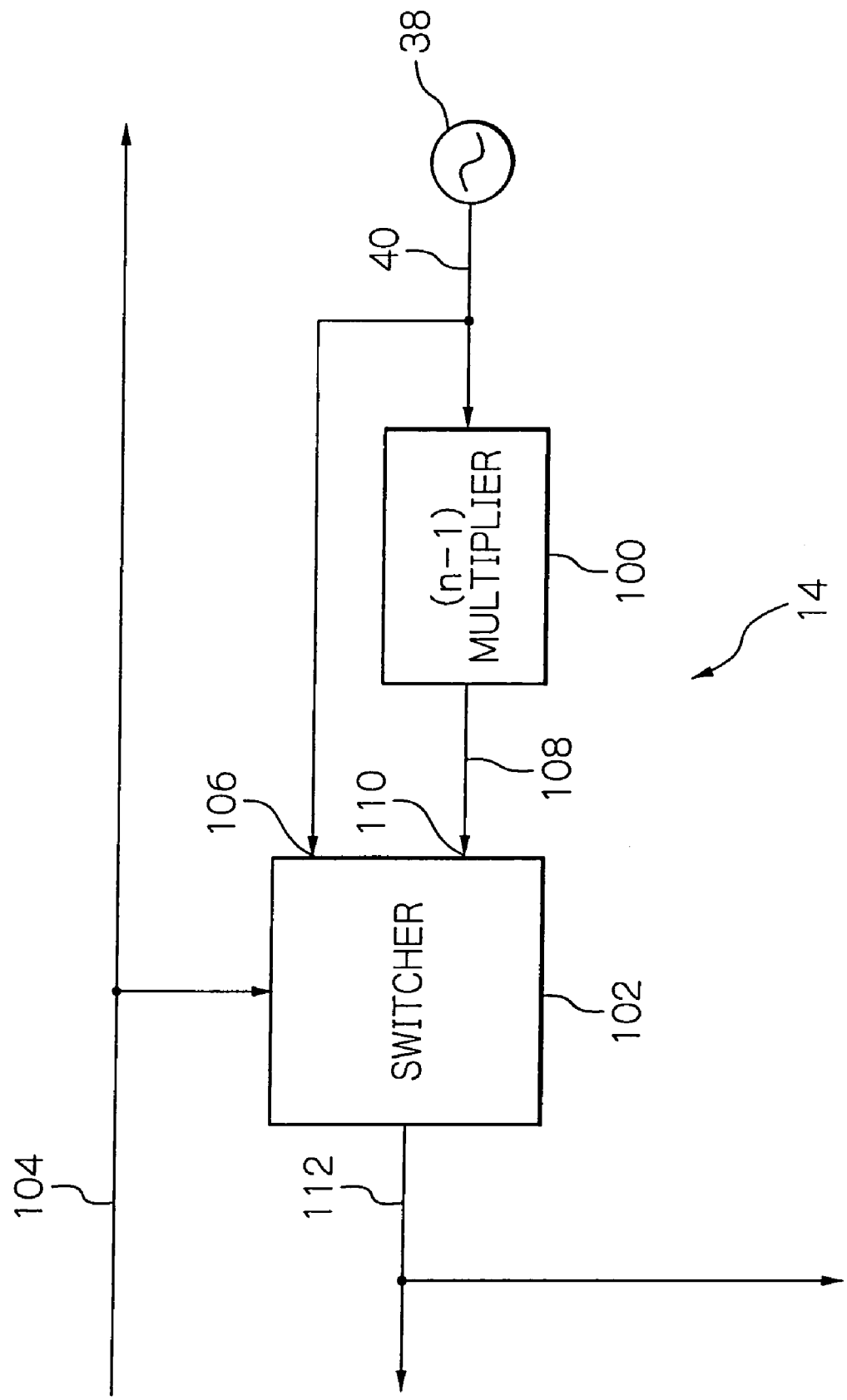
FIG. 10 is a schematic block diagram showing an alternative configuration of the reference signal generator shown in FIG. 1.

Referring then to FIG. 10, the reference signal generator 14 includes the clock signal generator 38, an (n−1) multiplier 100, and a switcher 102, which are interconnected as illustrated. The clock signal generator 38 has a function of generating the reference clock signal 40 at the reference frequency f01. The (n−1) multiplier 100 has a function of multiplying the frequency of the supplied clock signal 40 by the factor of (n−1). The switcher 102 has a function of selecting either one of the two input ports depending on the input control signal, each port receiving an input signal, and outputting the input signal on the selected input port from the output port 112. To the switcher 102, a 2:1 switcher may be applicable which includes two input ports, a control port, and an output port.

The reference signal generator 14 receives a monitor signal 104 that indicates which of the clock frequencies, f1 and f2, the input optical signal 22 has. The monitor signal 104 is produced by the phase comparator 16 as will be described below.

The reference signal generator 14 is not limited to the specific configuration shown in FIG. 10. The reference signal generator 14 may be adapted, for example, to include a couple of clock signal generators each of which outputs a clock signal at different one of the reference frequencies f01 and f02. The generator 14 may then be adapted to allow the switcher 102 to select either one of the outputs from the two clock signal generators and output it as the reference electrical signal.

The reference signal generator 14 may be adapted to include two multipliers that may multiply by multiples different from each other, and a branching circuit may divide the output from one clock signal generator into two signals, which are multiplied by the two multipliers with the different multiples, either one of the resultant signals from the multiplication being selected by the switcher to output the selected signal as the reference electrical signal.

The reference signal generator 14 outputs, when the monitor signal 104 indicates that the input optical signal 22 has the clock frequency f1, the reference electrical signal at the reference frequency f01. The reference signal generator 14 outputs, when the input optical signal 22 has the clock frequency f2, the reference electrical signal at the reference frequency f02.

The reference frequency f01 is given as a difference between the frequency f1 and the modulation frequency fm. The reference frequency f02 is given as a difference between the frequency f2 and the modulation frequency fm.

The modulation frequency fm may be given, for example, as a value dividing internally the frequencies f1 and f2 at the ratio of 1:(n−1), where n is an integer of three or more. Specifically, fm=((n−1)×f1+f2)/n. The reference frequency f01 is given as 1/n-th of the difference between the frequencies f1 and f2, i.e. f01=(f2−f1)/n (=fm−f1). The reference frequency f02 is given as (n−1)/n-th of the difference between the frequencies f1 and f2, i.e. f02=(f2−f1)×(n−1)/n(=f2−fm).

The clock signal generator 38 outputs the reference clock signal 40 at the reference frequency f01. The reference clock signal 40 is branched into two signals, which are sent to the (n−1) multiplier 100 and one end 106 of the switcher 102, respectively.

The (n−1) multiplier 100 may multiply the supplied reference clock signal 40 by a factor of (n−1), generating a clock signal 108 at the reference frequency f02, and supply the clock signal 108 to the other end 110 of the switcher 102.

The switcher 102 selects the input clock signal 40 or 108 depending on the monitor signal 104 used as the control signal. Specifically, the switcher 102 outputs, when the monitor signal 104 indicates that the input optical signal 22 has the clock frequency f1, the clock signal 40 as the reference electrical signal 112. When the monitor signal 104 indicates that the input optical signal 22 has the clock frequency f2, the switcher 102 outputs the clock signal 108 as the reference electrical signal 112. The generated reference electrical signal 112 is branched into two signals, which are sent to the phase comparator 16 and the clock signal generator 20, respectively. The reference signal generator 14 outputs the reference electrical signal 112 instead of the clock signal 40.

Figure 11:
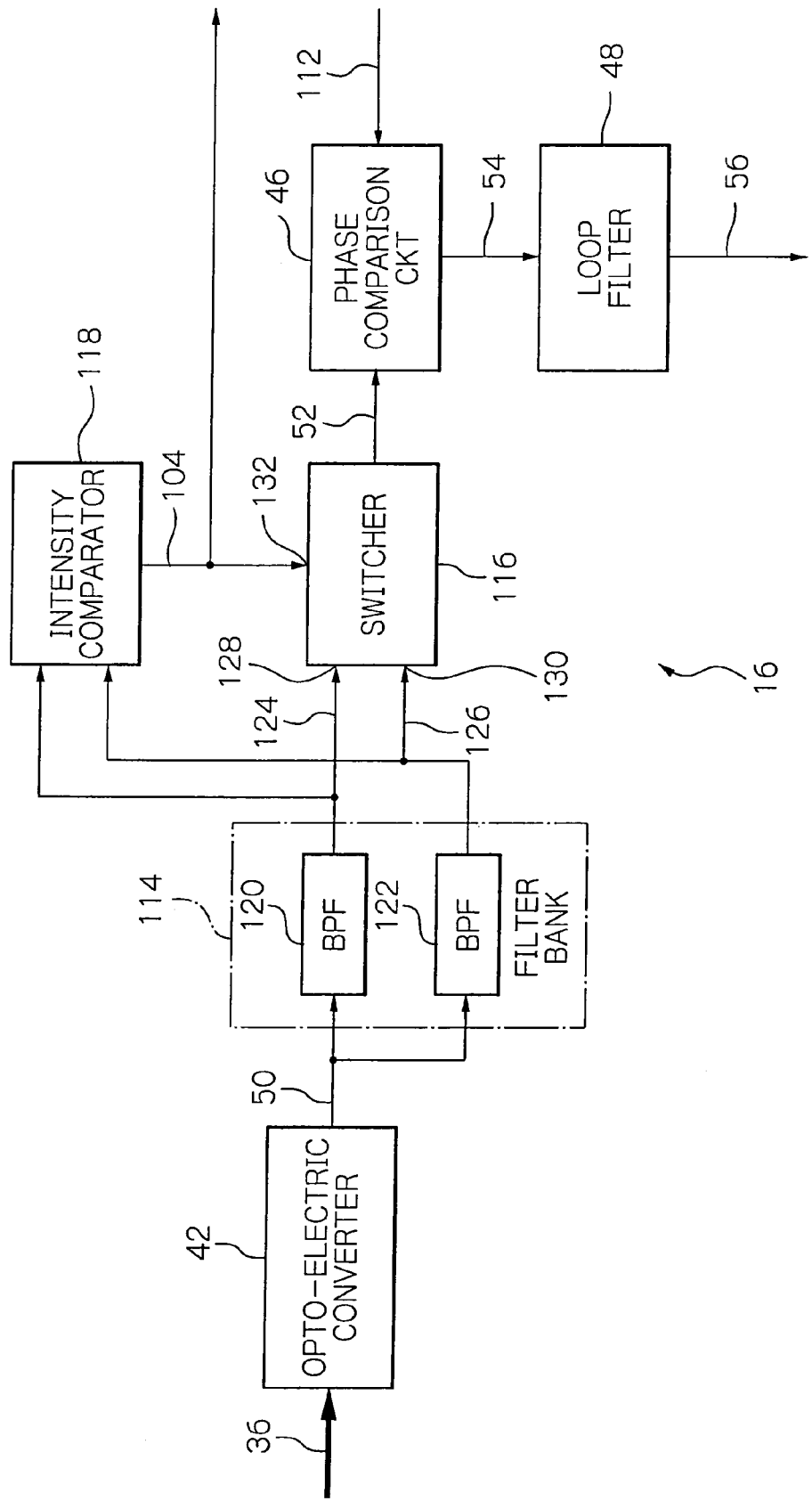
FIG. 11 is a schematic block diagram showing an alternative configuration of the phase comparator shown in FIG. 1.

Well, referring to FIG. 11, the phase comparator 16 includes the opto-electric converter 42, a filter bank 114, a switcher 116, the phase comparison circuit 46, the loop filter 48, and an intensity comparator 118, which are interconnected as shown. The filter bank 114 has a plurality of band pass filters. The filter bank 114 has a function of extracting only a signal component at a predetermined frequency from the supplied input signal 50, and outputting the signal at the extracted frequency. The filter bank 114 includes band pass filters 120 and 122. The filter bank 114 supplies signals 124 and 126 at the extracted frequency to the switcher 116 and the intensity comparator 118, respectively.

The switcher 116 has a function of selecting, from a plurality of supplied signals at different frequencies, one signal component at a frequency depending on the monitor signal 104. The switcher 116 selects one of the signals 124 and 126 at frequencies supplied from the filter bank 114 depending on the monitor signal 104 from the intensity comparator 118. The switcher 116 then outputs the signal at the selected frequency to the phase comparison circuit 46 as the filtered electrical pulse signal 52.

The intensity comparator 118 has a function of comparing in intensity a plurality of electrical pulse signals from the filter bank 114 with each other, using a comparison result to determine the clock frequency of the input optical signal, and producing a monitor signal indicating which of the clock frequencies, f1 and f2, the input signal has. The intensity comparator 118 receives the electrical pulse signals 124 and 126 and compares them with respect to intensity. The intensity comparator 118 produces the monitor signal 104 depending on a comparison result. The comparator 118 then outputs the monitor signal 104 to the switcher 116 and the reference signal generator 14.

The phase comparator 16 receives, as the modulated optical pulse signal 36, a component intensity-modulated by the EAM modulator 24 and passing through the transmission window at the modulation frequency fm. When the input optical signal 22 has the clock frequency f1, the signal component of the modulated optical pulse signal 36 from the EAM modulator 24 has the modulation frequency fm, the clock frequency f1, and the frequency of the mixing signal fm−f1=f01. When the input optical signal 22 has the clock frequency f2, the signal component of the modulated optical pulse signal 36 from the EAM modulator 24 has the modulation frequency fm, the clock frequency f2, and the frequency of the mixing signal f2−fm=f02.

The operation of the phase comparator 16 will briefly be described below. The supplied modulated optical pulse signal 36 is converted by the opto-electric converter 42 into the modulated electrical pulse signal 50. The modulated electrical pulse signal 50 is supplied to the band pass filters 120 and 122 in the filter bank 114. In this embodiment, the band pass filters 120 and 122 have transmission frequencies equal to the reference frequencies f01 and f02, respectively. The band pass filters 120 and 122 output the filtered electrical pulse signals 124 and 126 to both of the switcher 116 and the intensity comparator 118.

The intensity comparator 118 receives the electrical pulse signals 124 and 126, and compares them in intensity with each other. When the comparison shows that the electrical pulse signal 124 has a greater intensity than the electrical pulse signal 126, the intensity comparator 118 determines that the input optical signal 22 has the clock frequency f1. When the electrical pulse signal 124 has a greater intensity than the electrical pulse signal 126, the intensity comparator 118 determines that the input optical signal 22 has the clock frequency f2. The intensity comparator 118 produces the monitor signal 104 indicating which of the clock frequencies, f1 and f2, the input optical signal 22 has. The comparator 118 then outputs the signal 104 to the switcher 116 and the reference signal generator 14.

The configuration of the intensity comparator 118 is not limited to this specific embodiment. The intensity comparator 118 may include a plurality of band pass filters having the transmission frequencies thereof different from each other. The intensity comparator 118 then preferably receives the modulated electrical pulse signal 50 from the opto-electric converter 42.

The switcher 116 includes the 2:1 switcher like the switcher 102 in the reference signal generator 14. The switcher 116 has input ports 128 and 130 receiving the electrical pulse signals 124 and 126, respectively. The switcher 116 has a control port 132 that receives the monitor signal 104. The switcher 116 selects, when the monitor signal 104 indicates the clock frequency f1, the electrical pulse signal 124 as the pulse output signal 52 and outputs it. The switcher 116 selects, when the monitor signal 104 indicates the clock frequency f2, the electrical pulse signal 126 as the pulse output signal 52 and outputs it.

The pulse output signal 52 from the switcher 116 is supplied to the phase comparison circuit 46. The phase comparison circuit 46 also receives the reference electrical signal 112. The phase comparison circuit 46 compares in phase the pulse output signal 52 with the reference electrical signal 112, and outputs the comparison result as the phase difference electrical signal 54. When the compared signals are in phase with each other, the phase difference electrical signal 54 has an output voltage of 0 V. When the compared signals are out of phase from each other, the electrical signal 54 increases the output voltage in proportion to the phase difference.

The phase comparison circuit 46 outputs the electrical signal 54 to the loop filter 48. The loop filter 48 averages the input electrical signal 54 in respect of intensity over time, and outputs the average value in the form of phase comparison signal 56.

The modulation electrical signal generator 18 and the clock signal generator 20 may have the configurations thereof similar to those shown in FIGS. 3 and 6, respectively.

In the clock signal generator 20, the clock signal is selected, as described above, depending on the clock frequency of the input optical signal 22. Specifically, the clock signal generator 20 may select, when the input optical signal 22 has the clock frequency f1, the output signal 68 from the output filter 62 as the clock signal, and select, when the input optical signal 22 has the clock frequency f2, the output signal 70 from the output filter 64 as the clock signal.

A description will now be given of an example where the frequency f1 is 39.81312 [GHz], the frequency f2 is 41.25 [GHz], and n is 3. The modulation frequency fm divides internally the frequencies f1 and f2 at the ratio of 2:1 and is 40.29208 [GHz]. The reference frequency f01 is then 0.47896 [GHz] (=fm−f1), and the reference frequency f02 is 0.95792 [GHz] (=f2−fm).

Applying the configurations shown in FIGS. 10 and 11, the clock signal extraction system 10 operates as follows. The frequency fm of the modulation electrical signal is set between the frequencies f1 and f2. When the input optical signal 22 has the clock frequency f1, the reference electrical signal has the reference frequency f01. When the input optical signal 22 has the clock frequency f2, the reference electrical signal has the reference frequency f02.

Therefore, when the input optical signal 22 has the clock frequency f1, the combined signal mixing the modulation electrical signal with the reference electrical signal at the reference frequency f01 includes the difference frequency signal at the frequency f1. When the input optical signal 22 has the clock frequency f2, the combined signal mixing the modulation electrical signal with the reference electrical signal at the reference frequency f02 includes the sum frequency signal at the frequency f2.

As a consequence, when an input signal is input which has its clock frequency equal to either f1 or f2, the single clock signal extraction system 10 may extract that clock signal. The intensities for the respective frequencies of the modulated optical pulse signal can be used to produce the monitor signal 104 indicating which of the clock frequencies, f1 and f2, the input optical signal 22 has.

It is to be noted that the present embodiment may include the light modulation portion 12 structured as shown in FIG. 7. In that case, in addition to the advantages attained by the configuration resultant from applying the configurations shown in FIGS. 10 and 11, it is also possible to provide the clock signal extraction system 10 that may function as the PLL based system even for a larger timing jitter.

This embodiment may include the light modulator 12 resultant from additionally including the optical phase controller 84 shown in FIG. 8. In that case, in addition to the advantages attained from the configurations shown in FIGS. 10 and 11, it is also possible to extract the clock signal equal to the bit rate frequency from the input optical signal 22 encoded using the NRZ code.

Figure 12:
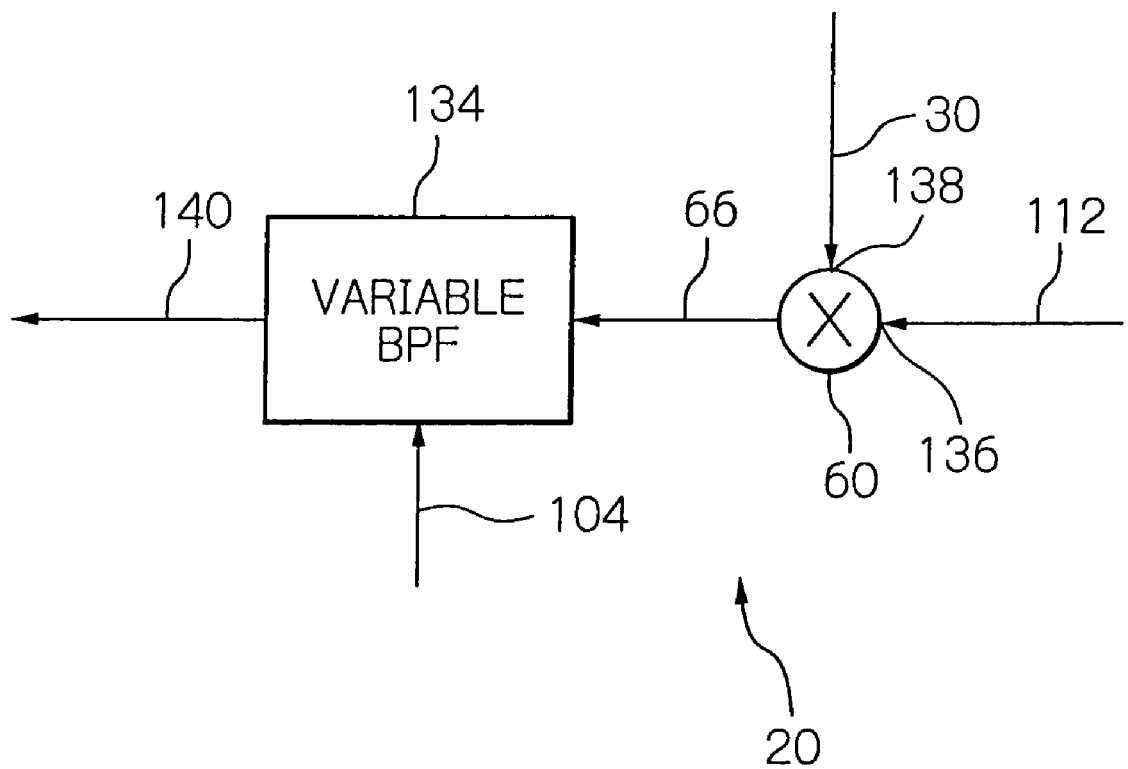
FIG. 12 is a schematic block diagram showing an alternative configuration of the clock signal generator shown in FIG. 1.

The clock signal extraction system 10 may include the components shown in FIGS. 3, 10 and 11 corresponding to those shown in FIG. 1, and the configuration shown in FIG. 12 as the clock signal generator 20. In that case, the clock signal generator 20 includes, as shown in FIG. 12, the mixer 60 and a variable band pass filter 134.

The mixer 60 has its one input 136 receiving the reference electrical signal 112 and its other input 138 receiving the modulation electrical signal 30. The mixer 60 develops the combined signal 66 including the sum and difference frequency signals obtained between the modulation electrical signal 30 and the reference electrical signal 112, and sends the combined signal 66 to the variable band pass filter 134.

The variable band pass filter 134 may be of a known type having a function of making the transmission frequency dependent on the signal input from outside. The variable band pass filter 134 receives the monitor signal 104, and is responsive to which of the clock frequencies, f1 and f2, the input optical signal 22 has to switch the transmission frequency to the frequency f1 or f2 accordingly. The variable band pass filter 134 outputs a clock signal 140 at the frequency f1 or f2.

The above-stated configuration thus allows the clock signal 140 from the clock signal extraction system 10 to be output from one terminal, thus eliminating an output selection carried out from outside.

Figure 13:
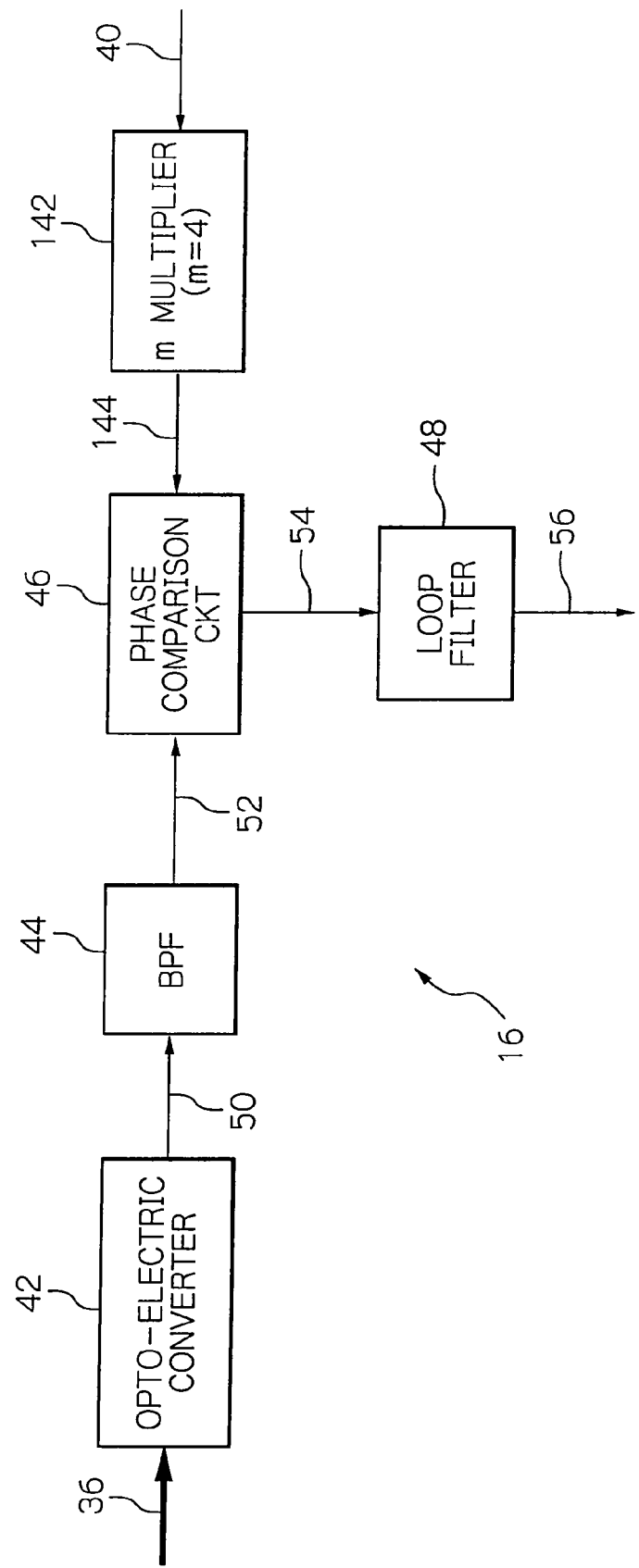
FIGS. 13 and 14 are schematic block diagrams showing other alternative configurations of the phase comparator shown in FIG. 1.

In the clock signal extraction system 10 shown in FIG. 1, the phase comparator 16 may be modified to include the components shown in FIG. 4 which additionally has an m multiplier 142 (m=4, for example) as shown in FIG. 13. The m multiplier 142 has a function of multiplying the input reference electrical signal 40 by a factor of m. The m multiplier 142 multiplies the reference electrical signal 40 input to the phase comparator 16 by a factor of m=4, generating a quadruple reference signal 144 to send the signal 144 to the phase comparison circuit 46.

In this configuration, the reference frequency f0, which is the frequency of the reference electrical signal, is given as half the difference between the frequencies f1 and f2 as in the previous embodiments. In that case, the input optical signal 22 is obtained by time-division multiplexing (TDM) an optical signal having the clock frequency f1 or f2. The multiplexing factor or multiple coefficient of the time-division multiplexing is set to four. Namely, the input optical signal 22 has a clock frequency of 4×f1 or 4×f2.

The EAM modulator 24 receives the modulation electrical signal 30 at the modulation frequency fm=(f1+f2)/2, and transmits only a component that passes through the transmission window at $4\times(fm-f1)=4\times f0$. The EAM modulator 24 outputs the modulated optical pulse signal 36 to the opto-electric converter 42. The modulated optical pulse signal 36 is converted by the opto-electric converter 42 into the modulated electrical pulse signal 50. The modulated electrical pulse signal 50 is output to the band pass filter 44. The band pass filter 44 selects, from the frequency components of the modulated electrical pulse signal 50, only the electrical pulse signal 52 at the frequency $4\times(fm-f1)$, i.e. the frequency $(fm-f1)$ multiplied by a factor of m, and sends the signal 52 to the phase comparison circuit 46. Generally, the multiple m is an integer of two or more.

The electrical pulse signals 52 and the quadruple reference electrical signal 144 are both input to the phase comparison circuit 46. The phase comparison circuit 46 compares in phase the electrical pulse signals 52 with the quadruple reference electrical signal 144, and sends the phase comparison result as the phase difference electrical signal 54. When the electrical pulse signal 52 and the quadruple reference electrical signal 144 are in phase with each other, the phase difference electrical signal 54 has an output voltage of 0 V. When the signals 52 and 144 are out of phase from each other, the signal 54 increases the output voltage in proportion to the phase difference.

The input optical signal 22 obtained by time-division multiplexing an optical signal having the clock frequency f1 or f2 is therefore intensity-modulated with the modulation electrical signal 30 at the modulation frequency fm, thus developing the modulated optical pulse signal 36. Consequently, regardless of which of the optical signals having its clock frequency f1 or f2 is time-division multiplexed to provide the optical pulse signal 36, the modulated optical pulse signal 36 will have its frequency equal to the reference frequency f0. When the modulation electrical signal 30 is adjusted in phase to provide zero phase difference between the electrical pulse signal 52 and the reference electrical signal 144 at the reference frequency f0 multiplied by four, and the sum and difference frequency signals obtained between the modulation electrical signal 30 and the reference electrical signal 144 are generated, the clock signal at the frequency f1 or f2 can be extracted from the input optical signal regardless of which of the optical signals having the clock frequency f1 or f2 is time-division multiplexed and input. The single clock signal extraction system 10 may thus extract a clock signal from two time-division multiplexed signals having the clock-frequency thereof different from each other.

The clock signal extraction system 10 may be modified to include the optical modulator 12 shown in FIG. 7. According to that structure, in addition to the previous advantages, it is also possible to provide a clock signal extraction system that may function as the PLL based system even for a larger timing jitter. The clock signal extraction system 10 may include the optical phase controller 84 shown in FIG. 8. In that case, in addition to the above advantages, it is also possible to extract, from the input optical signal encoded using the NRZ code, a clock signal at the frequency corresponding to the data rate.

Figure 14:
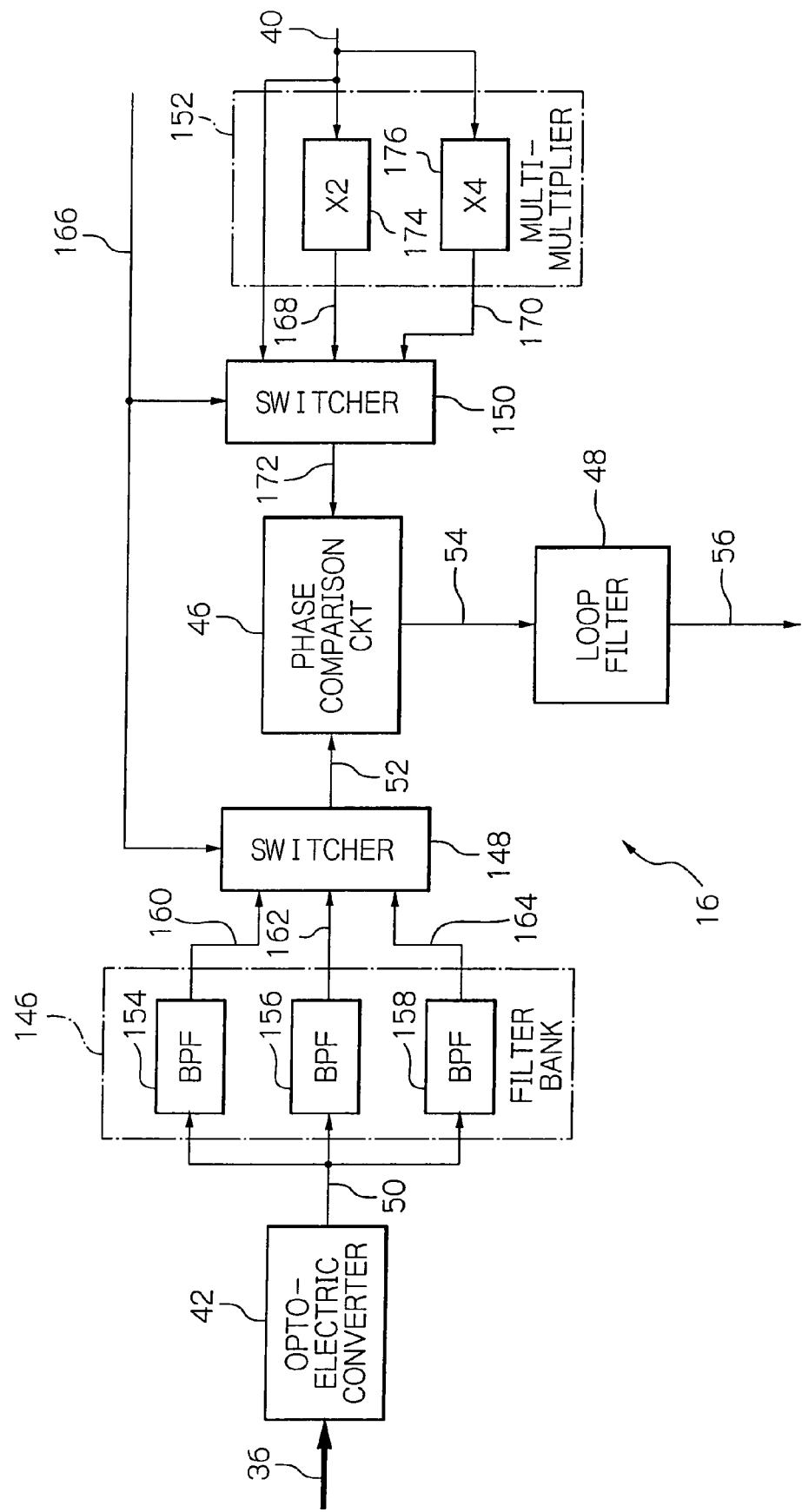

In the clock signal extraction system 10 shown in FIG. 1, the phase comparator 16 includes, as shown in FIG. 14, additional components such as a filter bank 146, switchers 148 and 150, and a multi-multiplier 152, which are interconnected as depicted. The filter bank 146 has a function of transferring only the frequency of the reference electrical signal and the frequencies given by multiplying the frequency of the reference electrical signal by multiples different from each other. The filter bank 146 includes bandpass filters 154, 156, and 158 that are set to such transmission frequencies. Band pass filters 154, 156, and 158 are set to, for example, the transmission frequencies of f0, $2\times f0$, and $4\times f0$, respectively. The band pass filters 154, 156, and 158 supply the output signals 160, 162, and 164, respectively, to the switcher 148.

The switcher 148 has a function of selecting one of the output signals 160, 162, and 164 depending on the supplied control signal 166. Also, the switcher 150 has a function of selecting one of the output signals 40, 168, and 170 depending on the supplied control signal 166. The switchers 148 and 150 each include a switcher including three input ports, a control port, and an output port.

The control signal 166 is indicative of by which of the multiples, one, two and four, the input optical signal is time-division multiplexed, or such a multiple per se.

The switcher 148 outputs the selected pulse output signal 52 to the phase comparison circuit 46. Also, the switcher 150 outputs the selected output signal 172 to the phase comparison circuit 46.

The multi-multiplier 152 has a function of branching the reference electrical signal 40 into sub-signals, and multiplying the frequencies of the sub-signals by multiples different from each other. The multi-multiplier 152 includes a double multiplier 174 and a quadruple multiplier 176, and branches the reference electrical signal 40 into three sub-signals, two of which are input to the double multiplier 174 and the quadruple multiplier 176, respectively, in the multi-multiplier 152. The double multiplier 174 and the quadruple multiplier 176 multiply the sub-signals of the reference electrical signal 40 by factors of two and four, respectively. The multipliers 174 and 176 then output the resultant signals to the switcher 150 as the reference electrical signals 168 and 170, respectively. The multi-multiplier 152 thus supplies the three reference electrical signals 40, 168, and 170 to the switcher 150.

The phase comparison circuit 46 compares in phase the pulse output signal 52 with the multiplication reference electrical signal 172, and outputs the comparison result to the loop filter 48 as the phase difference electrical signal 54.

The configuration stated above allows, when the input optical signal 22 is time-division multiplexed, the switchers 148 and 150 to be operated depending on the control signal 166 indicating the multiple, thus supplying one signal 52 from the filter bank 146 and another signal 172 from the multi-multiplier 152 to the phase comparison circuit 46. The single clock signal extraction system 10 may thus extract the clock signal from the input optical signals 22 at the frequencies f1 and f2 and from the time-division multiplexing signal obtained by multiplying the input optical signal 22.

Although the illustrative embodiments are directed to the input optical signal 22 that is multiplied by one, i.e. the signal 22 not time-division multiplexed, and the input optical signals 22 that are multiplied by two and four, respectively, to be time-division multiplexed, the invention is not limited thereto. Alternatively, the value of a multiple may be set depending on the configuration of the used optical communication network.

A description will now be given of the clock signal extraction system 10 resulting the configuration shown in FIG. 1 having the configurations shown in FIGS. 15, 16 and 17 applied. The clock signal extraction system 10 of such configuration is featured as including the reference signal generator 14, the phase comparator 16, and the clock signal generator 20.

It is assumed here that the clock frequency providing the time reference of the input optical signal 22 is either one of the plurality (p) of frequencies. The value p is an integer of two or more. It is also assumed that the p frequencies f1 to fp are different from each other and increase in the ascending order. The instant illustrative embodiment sets the value p to four.

Figure 15:
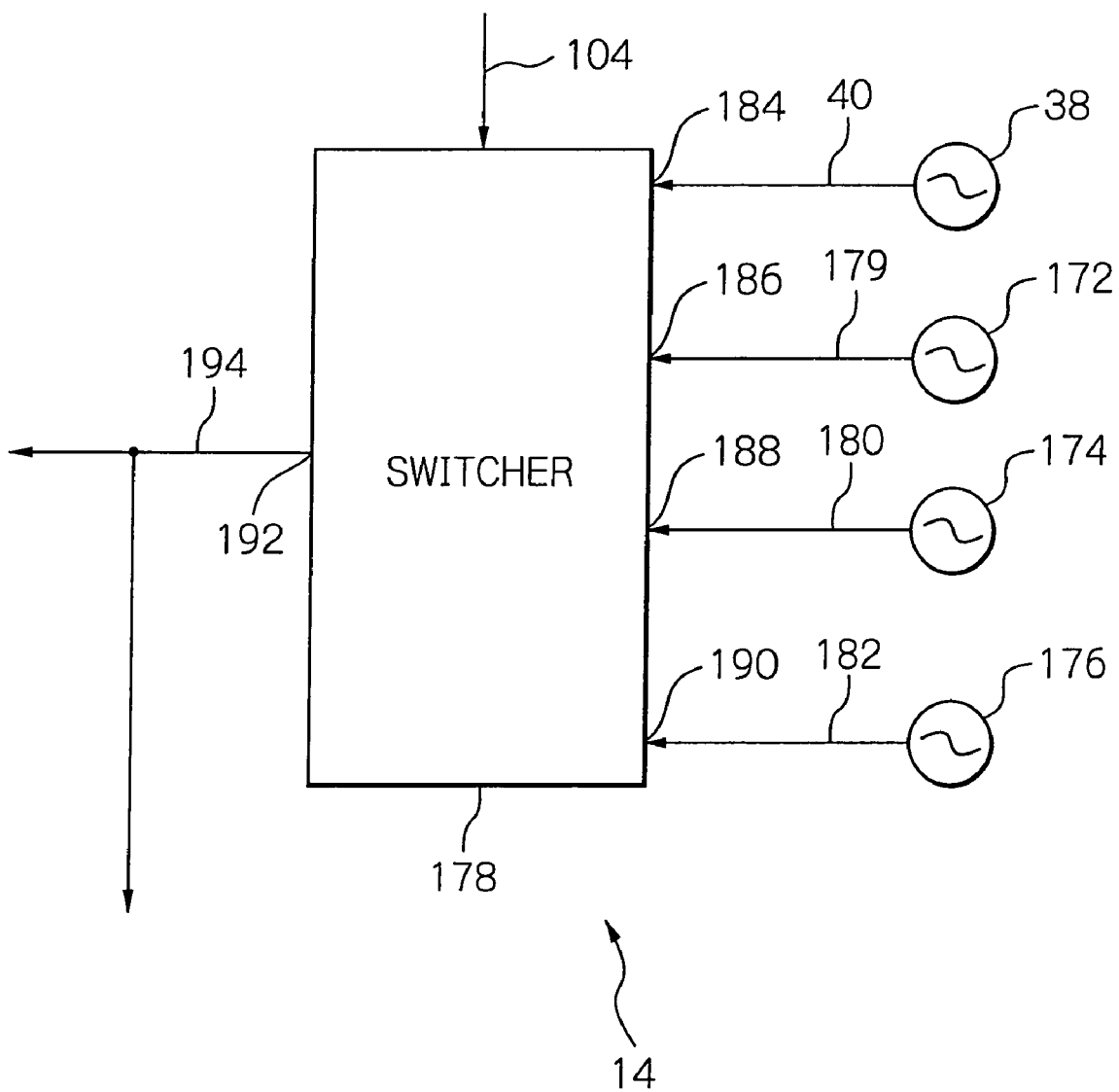
FIG. 15 is a schematic block diagram showing another alternative configuration of the reference signal generator shown in FIG. 1.

Referring now to FIG. 15, the reference signal generator 14 includes clock signal generators 38, 172, 174, and 176 which are interconnected to a switcher 178. The clock signal generators 38, 172, 174, and 176 have a function of generating reference electrical signals at the frequencies f01 to f04, respectively. The clock signal generators 38, 172, 174, and 176 supply reference electrical signals 40, 179, 180 and 182 at the frequencies f01 to f04 to input ports 184, 186, 188, and 190 in the switcher 178, respectively, as the clock signals.

The switcher 178 has a function of selecting, from the supplied reference electrical signals 40, 179, 180, and 182, one reference electrical signal 192 depending on the monitor signal 104, and outputting the selected signal 192. The switcher 178 outputs, in response to the monitor signal 104 indicating that the input optical signal 22 has the clock frequency f01, the reference electrical signal 40 input to the input port 184.

The switcher 178 also outputs other signals as follows. The switcher 178 outputs, when the input optical signal 22 has the clock frequency f02, the reference electrical signal 179 input to the input port 186. The switcher 178 outputs, when the input optical signal 22 has the clock frequency f3, the reference electrical signal 180 input to the input port 188. The switcher 178 outputs, when the input optical signal 22 has the clock frequency f4, the reference electrical signal 182 input to the input port 190. The switcher 178 outputs the selected reference electrical signal 194 from the port 192. The reference signal generator 14 branches the reference electrical signal 194 into two signals. The generator 14 outputs one signal to the phase comparator 16 and sends the other signal to the clock signal generator 20.

Figure 16:
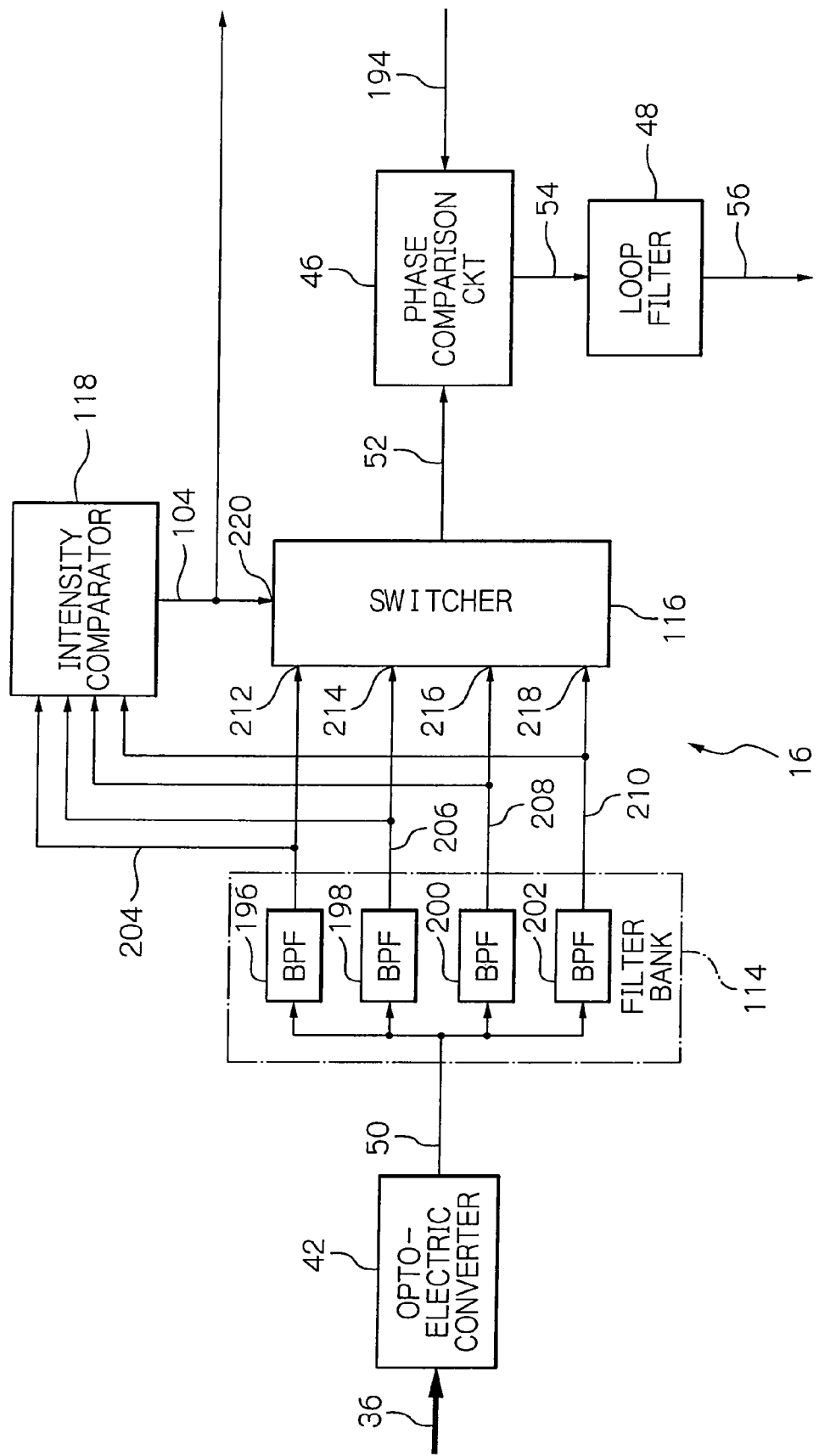
FIG. 16 is a schematic block diagram showing a still further alternative configuration of the phase comparator shown in FIG. 1.
Figure 17:
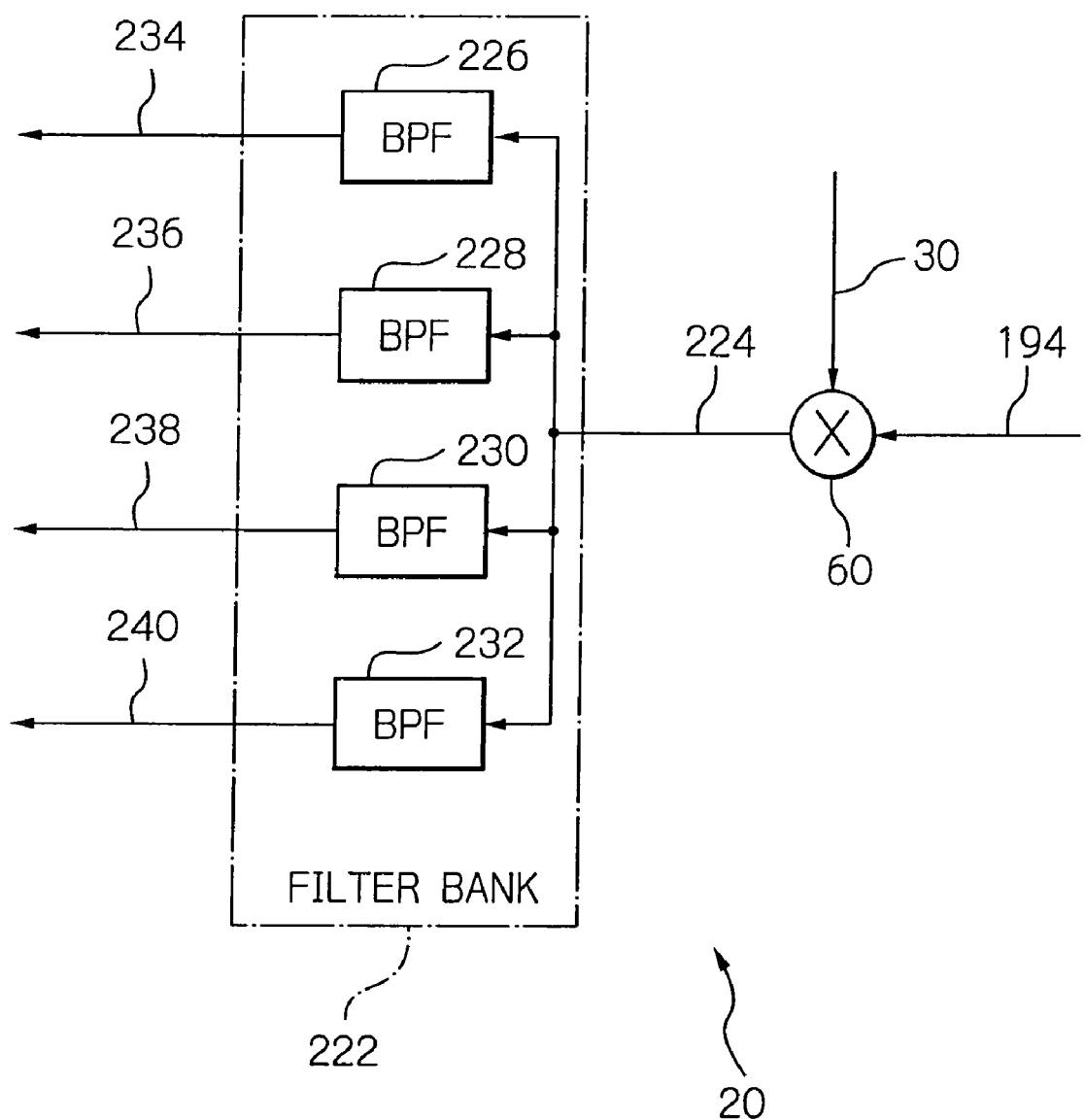
FIG. 17 is a schematic block diagram showing another alternative configuration of the clock signal generator shown in FIG. 1.

The phase comparator 16 shown in FIG. 16 may be basically similar to the configuration shown in FIG. 11. The phase comparator 16 differs from the configuration shown in FIG. 11 in that it includes a different filter bank 114. The filter bank 114 is specific to the filter bank 114, and includes band pass filters 196, 198, 200, and 202 interconnected as shown. The filter bank 114 branches the modulated electrical pulse signal 50 into four signals, and supplies them to the band pass filters 196, 198, 200, and 202, respectively. The band pass filters 196, 198, 200, and 202 filter the modulated electrical pulse signal 50 with different frequencies, and output filtered output signals 204, 206, 208, and 210 to both of the switcher 116 and the intensity comparator 118.

The intensity comparator 118 compares in intensity the supplied output signals 204, 206, 208, and 210 with each other. The intensity comparator 118 determines, when the comparison shows that the electrical pulse signal 204 has the maximum intensity, that the input optical signal 22 has the clock frequency f1. The intensity comparator 118 also determines, when the electrical pulse signals 206, 208, and 210 have the respectively maximum intensities, that the input optical signal 22 has the clock frequencies f2, f3, and f4, respectively. The intensity comparator 118 outputs to the switchers 116 and 178 the monitor signal 104 indicating which of the clock frequencies, f1, f2, f3 and f4, the input optical signal 22 has.

The switcher 116 receives the output signals 204, 206, 208, and 210 at the four input ports 212, 214, 216, and 218, respectively. The switcher 116 has a control port 220 receiving the monitor signal 104. The switcher 116 selects, depending on which of the clock frequencies, f1, f2, f3 and f4, the input optical signal 22 has, one of the signals 204 to 210 that are input to the respective input ports 212 to 218, and outputs the pulse output signal 52 to the phase comparison circuit 46.

The phase comparison circuit 46 receives the pulse output signal 52 and the reference electrical signal 194. The phase comparison circuit 46 compares in phase the pulse output signal 52 with the reference electrical signal 194, and outputs the comparison result to the loop filter 48 as the phase difference electrical signal 54. The phase difference electrical signal 54 outputs, when the compared signals 52 and 194 are in phase with each other, a signal having an output voltage of 0 V to the loop filter 48, and outputs, when the signals 52 and 194 are out of phase from each other, a signal having an output voltage proportional to the phase difference between the signals 52 and 194 to the loop filter 48.

The loop filter 48 receives the phase difference electrical signal 54, averages the signal 54 with respect to intensity over time, and outputs the average as the phase comparison signal 56 to the modulation electrical signal generator 18.

The clock signal generator 20 includes the mixer 60 and a filter bank 222. The mixer 60 mixes the modulation electrical signal 30 with the reference electrical signal 194, thus generating the combined signal 224 including the sum and difference frequency signals obtained between the modulation electrical signal 30 and the reference electrical signal 194. The mixer 60 outputs the combined signal 224 to the filter bank 222.

The filter bank 222 includes band pass filters 226, 228, 230, and 232. The combined signal 224 is branched into four signals and is supplied to the band pass filters 226, 228, 230, and 232, respectively.

The band pass filters 226, 228, 230, and 232 are output filters that each have a function of transferring only a signal at the transmission frequency. The band pass filters 226, 228, 230, and 232 output the extracted clock signals 234, 236, 238 and 240, respectively.

A description will be given of an example where the frequencies f1 and f2 are lower than the modulation frequency fm and the frequencies f3 and f4 are higher than the modulation frequency fm. When the reference electrical signal 194 has the reference frequency f01=fm−f1, the difference frequency signal of the combined signal 224 of the modulation electrical signal 30 and the reference electrical signal 194 has the frequency f1. Likewise, when the reference electrical signal 194 has the reference frequency f02=fm−f2, the difference frequency signal of the combined signal 224 of the modulation electrical signal 30 and the reference electrical signal 194 has the frequency f2.

When the reference electrical signal 194 has the reference frequency f03=f3−fm, the sum frequency signal of the combined signal 224 of the modulation electrical signal 30 and the reference electrical signal 194 has the frequency f3. Likewise, when the reference electrical signal 194 has the reference frequency f04=f4−fm, the sum frequency signal of the combined signal of the modulation electrical signal 30 and the reference electrical signal 194 has the frequency f4.

In the clock signal extraction system 10, regardless of which of the clock frequencies, f1, f2, f3 and f4, the input signal has, the difference or sum frequency signal obtained between the modulation electrical signal 30 and the reference electrical signal 194 may be used to allow the sole clock signal extraction system 10 to extract the clock signal.

When the reference frequencies 194 are all different from teach other, the electrical pulse signals 201 to 210 may be compared in intensity with each other, thus outputting the monitor signal 104 indicating which of the clock frequencies, f1, f2, f3 and f4, the input optical signal 22 has.

The entire disclosure of Japanese patent application No. 2006-268077, filed on Sep. 29, 2006, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A clock signal extraction system comprising:
an optical modulator that intensity-modulates an input optical signal outside with a modulation electrical signal, outputting a modulated optical pulse signal, the input optical signal having a clock frequency substantially equal to a predetermined first frequency or a predetermined second frequency different from the predetermined first frequency, the modulation electrical signal having a modulation frequency of an average of the predetermined first and second frequencies;
a reference signal generator that generates a reference electrical signal at a reference frequency;
a phase comparator that compares in phase the modulated optical pulse signal with the reference electrical signal, and outputs a comparison result as a phase comparison signal;
a modulation electrical signal generator that receives the phase comparison signal, and outputs the modulation electrical signal; and
a clock signal generator that mixes the modulation electrical signal with the reference electrical signal, generates a combined signal, filters the combined signal, and outputs the filtered signal as a clock signal.

2. The system in accordance with claim 1, wherein said reference signal generator generates the reference electrical signal at a reference frequency given as half a difference between the predetermined first and second frequencies.

3. The system in accordance with claim 1, wherein said phase comparator comprises:
an opto-electric converter that converts the modulated optical pulse signal into a modulated electrical pulse signal and outputs the electrical pulse signal;
a band pass filter that filters the modulated electrical pulse signal, outputting the electrical pulse signal at the reference frequency;
a phase comparison circuit that compares in phase the electrical pulse signal with the reference electrical signal, and outputs a difference component between the electrical pulse signal and the reference electrical signal as a phase difference electrical signal; and
a loop filter that averages the phase difference electrical signal over time, and outputs a time-average component as the phase comparison signal.

4. The system in accordance with claim 1, wherein said clock signal generator comprises a filter bank that filters the combined signal,
said filter bank comprising:
a first band pass filter that outputs, when the input optical signal has a clock frequency of the predetermined first frequency, a clock signal at the predetermined first frequency; and
a second band pass filter that outputs, when the input optical signal has a clock frequency of the predetermined second frequency, a clock signal at the predetermined second frequency.

5. The system in accordance with claim 1, wherein said reference signal generator comprises:

a multiplier that multiplies the reference frequency of the reference electrical signal; and
a switcher that selects a reference electrical signal of the reference frequency or a reference electrical signal of the multiplied reference frequency depending on a monitor signal indicating whether the input optical signal has the clock frequency equal to the predetermined first frequency or the predetermined second frequency, and outputs the selected reference electrical signal to said phase comparator,
said phase comparator comprising:
an opto-electric converter that photoelectrically converts the modulated electrical pulse signal into a modulated optical pulse signal;
a band pass filter bank that filters the modulated electrical pulse signal, and outputs a first electrical pulse signal at a first reference frequency and a second electrical pulse signal at a second reference frequency;
an intensity comparator that receives the first and second electrical pulse signals, compares in intensity the two electrical pulse signals with each other, generates the monitor signal depending on a comparison result, and outputs the monitor signal;
a switcher that selects one of the first and second electrical pulse signals depending on the supplied monitor signal, and outputs the selected electrical pulse signal as a modulated electrical pulse signal;
a phase comparison circuit that compares in phase the modulated electrical pulse signal with the reference electrical signal, and outputs a comparison result as a phase difference comparison signal; and
a loop filter that averages the phase difference electrical signal over time, and outputs a time average component as the phase comparison signal.

6. The system in accordance with claim 5, wherein said clock signal generator includes a variable filter that varies a transmission frequency for the combined signal depending on the monitor signal, and filters the combined signal.

7. The system in accordance with claim 3, wherein said phase comparator comprises a multiplier that multiplies a reference frequency of the reference electrical signal,
said multiplier outputting a reference electrical signal of a multiplied reference frequency to said phase comparison circuit.

8. The system in accordance with claim 1, wherein said phase comparator comprises:
an opto-electric converter that photoelectrically converts the modulated electrical pulse signal into a modulated optical pulse signal;
a band pass filter bank that filters the modulated electrical pulse signal, and outputs a first electrical pulse signal at a first reference frequency and a second electrical pulse signal at a second reference frequency;
a first switcher that selects one of the first and second electrical pulse signals depending on a supplied switching control signal, and outputs the selected electrical pulse signal as a modulated electrical pulse signal,
a multiplier that multiplies a reference frequency of the reference electrical signal,
a second switcher that selects a reference electrical signal of the reference frequency or a reference electrical signal of the multiplied reference frequency depending on the switching control signal, and outputs the selected reference electrical signal;
a phase comparison circuit that compares in phase the modulated electrical pulse signal with the reference electrical signal, and outputs a comparison result as a phase difference comparison signal; and a loop filter that averages the phase difference electrical signal over time, and outputs a time average component as the phase comparison signal, said switching control signal being supplied from outside.

9. The system in accordance with claim 1, wherein said optical modulator comprises:

a first electro-absorption optical modulator that intensity-modulates the input optical signal, outputting an optical signal;

an optical amplifier that amplifies the optical signal; and a second electro-absorption optical modulator that intensity-modulates the amplified optical signal.

10. The system in accordance with claim 1, wherein said optical modulator comprises an electro-absorption optical modulator that intensity-modulates the input optical signal, outputting an optical signal, said optical modulator also comprising, on an input of said electro-absorption optical modulator:

an optical splitter that splits an input optical signal encoded using a non-return to zero (NRZ) code into two sub-signals;

an optical phase controller that delays a phase of one of the sub-signals; and an optical multiplexer that couples the sub-signal having a delayed phase with the other sub-signal to generate an optical pulse signal.

11. A method of extracting a clock signal, comprising the steps of:

receiving an input optical signal having a clock frequency substantially equal to a predetermined first frequency or a predetermined second frequency different from the predetermined first frequency;

intensity-modulating the input optical signal with a modulation electrical signal, outputting a modulated optical pulse signal, the modulation electrical signal having a modulation frequency of an average of the predetermined first and second frequencies;

generating a reference electrical signal at a reference frequency;

comparing in phase the modulated optical pulse signal with the reference electrical signal, and outputting a comparison result as a phase comparison signal;

receiving the phase comparison signal, and generating and outputting the modulation electrical signal; and mixing the modulation electrical signal with the reference electrical signal, generating a combined signal, and filtering the combined signal, and outputting, when the input optical signal has a clock frequency of the predetermined first frequency, a clock signal at the predetermined first frequency, and outputting, when the input optical signal has a clock frequency of the predetermined second frequency, a clock signal at the predetermined second frequency.

12. The method in accordance with claim 11, wherein the reference frequency of the reference electrical signal is half a difference between the predetermined first and second frequencies.

13. The method in accordance with claim 11, wherein the reference electrical signal is, when the input optical signal has a clock frequency of the predetermined first frequency, a first reference frequency given as a difference between the predetermined first frequency and the modulation frequency, and the reference electrical signal is, when the input optical signal has a clock frequency of the predetermined second frequency, a second reference frequency given as a difference between the predetermined second frequency and the modulation frequency.

14. The method in accordance with claim 13, wherein the modulation frequency is set to a value dividing internally the predetermined first and second frequencies at a ration of 1:(n−1), where n is an integer of three or more, the first reference frequency being to a value given as 1/n-th of a difference between the predetermined first and second frequencies, the second reference frequency being to a value given as (n−1)/n-th of a difference between the predetermined first and second frequencies.

15. The method in accordance with claim 11, wherein the input optical signal is derived by using the predetermined first or second frequency as the clock frequency and by time-division multiplexing the predetermined first or second frequency, in said step of comparing in phase the modulated optical pulse signal with the reference electrical signal, the reference electrical signal being multiplied by m, where m is an integer of two or more.

\* \* \* \* \*